(12) United States Patent  (10) Patent No.: US 7,574,332 B2
Ballin et al.  (45) Date of Patent: Aug. 11, 2009

(54) APPARATUS AND METHOD FOR GENERATING BEHAVIOUR IN AN OBJECT

(75) Inventors: Daniel Ballin, Ipswich (GB); Marco Gillies, Ipswich (GB)

(73) Assignee: British Telecommunications plc, London (GB)

( * ) Notice: Subject to any disclaimer, the term of this patent is extended or adjusted under 35 U.S.C. 154(b) by 144 days.

(21) Appl. No.: 10/550,205

(22) PCT Filed: Mar. 24, 2004

(86) PCT No.: PCT/GB2004/001301

§ 371 (c)(1),
(2), (4) Date: Sep. 21, 2005

(87) PCT Pub. No.: WO2004/086208

PCT Pub. Date: Oct. 7, 2004

(65) Prior Publication Data

US 2006/0224546 A1  Oct. 5, 2006

(30) Foreign Application Priority Data

Mar. 25, 2003 (GB) ................... 0306875.6

(51) Int. Cl.
 G06F 7/60 (2006.01)
 G06T 13/00 (2006.01)
(52) U.S. Cl. .......................... 703/2; 345/473
(58) Field of Classification Search ...... 703/2; 700/244; 345/473, 474
See application file for complete search history.

(56) References Cited

U.S. PATENT DOCUMENTS 5,880,731 A * 3/1999 Liles et al. .................. 715/758
5,884,029 A 3/1999 Brush, II et al.
5,982,853 A 11/1999 Liebermann
6,212,502 B1 4/2001 Ball et al.
6,292,198 B1 * 9/2001 Matsuda et al. ............. 345/473
6,522,333 B1 * 2/2003 Hatlelid et al. ............. 345/474
6,560,511 B1 5/2003 Yokoo et al.

(Continued)

FOREIGN PATENT DOCUMENTS

EP 0978790 A1 2/2000

(Continued)

OTHER PUBLICATIONS

Sato et al, Autonomous Behavior Control of Virtual Actors Based on the AIR Model, Computer Animation '97 Geneva, Switzerland, Jun. 5-6, 1997, pp. 113-118.

(Continued)

*Primary Examiner*—Paul L Rodriguez
*Assistant Examiner*—Eunhee Kim
(74) *Attorney, Agent, or Firm*—Nixon & Vanderhye PC

(57) ABSTRACT

A hierarchical behavioral framework is used to generate and control autonomous and semi-autonomous behavior in an articulate object. A behavioral controller is arranged to receive input associated with a behavioral action, to infer a plurality of behavioral parameter values using the framework, and to generate equivalent behavior in the articulate object using the parameter values when loaded in the behavioral controller to generate output corresponding to the equivalent behavior. The equivalent behavior may reproduce the inputted behavioral action, and/or include one or more other behavioral actions, which may be performed simultaneously or as part of a sequence of actions.

26 Claims, 15 Drawing Sheets

U.S. PATENT DOCUMENTS

| | | | |
|---|---|---|---|
| 7,061,493 | B1 | 6/2006 | Cook et al. |
| 7,089,083 | B2 | 8/2006 | Yokoo et al. |
| 2003/0137515 | A1 | 7/2003 | Cederwall et al. |
| 2003/0191560 | A1 | 10/2003 | Yokoo et al. |
| 2006/0184355 | A1 | 8/2006 | Ballin et al. |

FOREIGN PATENT DOCUMENTS

| | | |
|---|---|---|
| EP | 0992927 A1 | 4/2000 |
| EP | 1 255 203 A2 | 11/2002 |
| EP | 1255203 A2 | 11/2002 |
| JP | 11-143849 | 5/1999 |
| JP | 2000-353037 | 12/2000 |
| WO | 00/66239 | 11/2000 |
| WO | WO 01/27879 A1 | 4/2001 |

OTHER PUBLICATIONS

International Search Report dated Sep. 27, 2004.
International Search Report dated Sep. 27, 2004.
European Office Action in Appln. 04 723 252.2 dated Mar. 20, 2006.
European Office Action in Appln. 04 722 892.9 dated Mar. 14, 2006.
International Preliminary Report on Patentability and Written Opinion of the International Searching Authority dated Oct. 1, 2005 (counterpart of U.S. Appl. No. 10/549,750).
International Preliminary Report on Patentability and Written Opinion f the International Searching Authority dated Oct. 1, 2004 (counterpart of U.S. Appl. No. 10/550,205).
Chinese Office Actions in a counterpart application issued on Apr. 16, 2007, and Oct. 26, 2007.
Benford, et al., "Embodiments, Avatars, Clones and Agents for Multi-User, Multi-Sensory Virtual Worlds," Multimedia Systems, vol. 5, pp. 93-104 (1997).
Bailin, et al., "Personal Virtual Humans: Inhabiting the Talk Zone and Beyond," BT Technology Journal, vol. 20, No. 1, Kluwer (ed.) (Jan. 2002).
Del Bimbo, et al., "Specification by Example of Virtual Agents Behavior," IEEE Transactions on Visualization and Computer Graphics, vol. 1, No. 4 (Dec. 1999).
Slater, et al., "Body Centred Interaction in Immersive Virtual Environments," Artificial Life and Virtual Reality, N. Magnenat-Thalmann, et al. (eds.), pp. 125-148, John Wiley and Son (1994).
Thórisson, "Layered Modular Action Control for Communicative Humanoids," Computer Animation, Geneva, Switzerland, pp. 134-143 (Jun. 5-6, 1997).
Ball, et al., "Emotion and Personality in a Conversational Agent," Embodied Conversational Agents, Cassell, etal. (eds.), the MIT Press, Cambridge, MA (2009).
Scerri, et al., "End User Specification of RoboCup Teams," RoboCup-99: Robot Soccer World Cup III, Springer-Verlag Lecture Notes in Artificial Intelligence (LNAI) (2000).
Hsu, et al., "Direct Manipulation of Free-Form Deformations" (1992).
Blumberg, et al., "Multi-Level Direction of Autonomous Creatures for Real-Time Virtual Environments," pp. 47-54, MIT Media Lab, Cambridge, MA (1995).
Perlin, et al., "Improv: A System of Scripting Interactive Actors in Virtual Worlds" (1996).
Tu, etal., "Artificial Fishes: Physics, Locomotion, Perception, Behavior" (1994).
Cassell, et al., "Embodiment in Conversational Interfaces: Rea," MIT Media Lab, Cambridge, MA (1999).
Ball, et al., "Modeling the Emotional State of Computer Users," submitted to Workshop in Attitude, Personality and Emotion in User-Adapted Interaction (1999).
Abrilian, et al., "Specifying Cooperation between Modalities in Life-like Animated Agents" (2002).
Gain, "Enhancing Spatial Deformation for Virtual Sculpting," a dissertation submitted for the Degree of Doctor of Philosophy, St. John's College, University of Cambridge, Cambridge, MA (Jun. 2000).
International Search Report dated Jul. 9, 2004, in PCT/GB2004/001276.
EP office action dated Mar. 20, 2006, in EP 04 723 252.5.
EP office action dated Mar. 14, 2006, in EP 04 722 892.9.
International Preliminary Report on Patentability and Written Opinion of the International Searching Authority dated Oct. 1, 2005 (counterpart of USSN 10/549,750).
International Preliminary Report on Patentability and Written Opinion of the International Searching Authority dated Oct. 1, 2004 (counterpart of USSN 10/550,205).
International Search Report dated Sep. 27, 2004, in PCT/GB2004/001301.
Office Action dated Apr. 14, 2009, in U.S. Appl. No. 10/549,750.
Office Action mailed Apr. 7, 2009 in JP 2006-506025 with English translation.
Office Action mailed Feb. 24, 2009 in JP 2006-506015 with English translation.
H. Ushida et al., "Technology of interface close to the real world - machines having hearts," Information Processing, vol. 41, No. 2, Feb. 15, 2000, pp. 127-136, Japan: Information Processing Society of Japan, with partial English translation.
N. Tosa et al., "Creating an imaginary world with autonomous virtual actors that responds to emotions," Japan Virtual Reality Society Collection, vol. 2, No. 1, Mar. 31, 1997, pp. 11-18, Japan: Japan Virtual Reality Society, with partial English translation.

* cited by examiner

US 7,574,332 B2

APPARATUS AND METHOD FOR GENERATING BEHAVIOUR IN AN OBJECT

This application is the US national phase of international application PCT/GB2004/001301 filed 24 Mar. 2004 which designated the U.S. and claims benefit of GB 0306875.6, dated 25 Mar. 2003, the entire content of which is hereby incorporated by reference.

BACKGROUND

1. Technical Field

This invention relates to a method of and apparatus for generating behaviour in an object. Although the invention is not limited thereto, one application of particular interest is the generation of autonomous behaviour conveying body language in a virtual agent or object, for example an avatar.

2. Related Art

Animated objects, whether virtual (such as an avatar) or robotic (for example, a pet "toy") are becoming increasingly sophisticated in their behaviour. In particular, there is a consumer demand for more realistic behaviour by virtual objects such as avatars and animated agents. In the context of this invention, an avatar is defined to be a visual representation of a user in a virtual environment, taking any appropriate form. An animated agent is an intelligent software based agent used for interactions with a user in a virtual environment, or for interactive entertainment. Similarly, the animated agent may take any appropriate form.

When an object is capable of having animated behaviour, it is desirable for a user who is relatively unskilled in programming to have the ability to personalise the object's behaviour. This is particularly so when the user is seeking, for example, to create a sense of individuality in a group setting, to enhance a role the object is playing, or to reflect the user's own personality. To make objects more interesting to their human users, it is desirable if a personality can be provided for an object, i.e., if the behaviour can be modified by the user to have certain traits that the user finds desirable.

To satisfy these demands, the behavioural models used to generate the behaviour in an animated object are becoming increasingly complex. This creates a conflict when a user relatively unskilled in programming wishes to modify the behaviour of an object, as they lack the expertise required to interface with the complex programs representing the behavioural model and modify the code underlying the behaviour.

Techniques to generate autonomous behaviour in an object and provide objects with personality which already known in the art are limited in their usefulness. Generally, a poor compromise is reached when providing an unskilled individual with suitable means to modify an object's behaviour and supporting complex behaviour by the object. This is especially so if a user wishes to modify the behaviour of an object in real-time.

Limited means to enable an unskilled user to modify the behaviour of a virtual object such as an avatar are disclosed in the art. For example, in U.S. Pat. No. 5,884,029 "User interaction with intelligent virtual objects, avatars, which interact with other avatars controlled by different users" by Brush II et al, a method and apparatus enabling a user to program a personality into an intelligent virtual object such as an avatar is disclosed. In this example, an avatar's personality is created by enabling the avatar to respond semi-autonomously to external stimulus using a pre-programmed set of responses. This method is of limited usefulness for many reasons, in particular as an unskilled user is not able to select which personality traits define the autonomous behaviour, and also as an unskilled user cannot modify the personality of an avatar in real-time.

In U.S. Pat. No. 6,212,502 "Modelling and Projecting Emotion and Personality from a Computer User Interface" by Ball et al, a method is disclosed which determines the probable emotional state of a user and then represents the user's emotional behaviour in a personal avatar to enhance the user's experience of a virtual world. This method is of limited usefulness as the user is not able to intervene and control the behaviour of the avatar if they wish the avatar's behaviour to differ from their own.

In U.S. Pat. No. 5,880,731 "Use of avatars with automatic gesturing and bounded interaction in on-line chat session" by Liles et al, a user can select from a limited menu certain gestures for an avatar to perform autonomously when the avatar is otherwise inactive. As the personality comprises selected gestures which are automatically displayed from time to time when the avatar is not performing deliberate actions under the control of the user, no modification to the behaviour is made to enhance the actions under the intentional control of the user.

The present invention seeks to provide apparatus for and a method of generating autonomous behaviour in an object which obviates and/or mitigates the disadvantages known in the art described hereinabove.

BRIEF SUMMARY

According to a first aspect of the invention there is provided a method of generating behaviour for an object under the control of a behavioural controller, the method comprising the steps of: receiving input associated with a behavioural action; inferring a plurality of behavioural parameter values from said input in accordance with a behavioural framework arranged to generate behaviour by the object; deriving output from the inferred plurality of behavioural parameter values; and generating equivalent behaviour by the object using the output derived from the parameter values.

According to a second aspect of the invention, there is provided a method of inferring a plurality of internal parameter values for a behavioural controller for an object, the method comprising the steps of receiving input representing a behavioural action; inferring from said received input a set of at least one output values which corresponds to an equivalent behavioural action by the object; and inferring a value for each said plurality of internal parameters from said set of at least one output values, wherein the value inferred for each said plurality of internal parameters produces output by the behavioural controller resulting in equivalent behaviour to the equivalent behavioural action.

According to a third aspect of the invention, there is provided a method of generating behaviour in an object, the method comprising inferring a plurality of parameter values for a behavioural controller for an object according to the method of the second aspect, the method further comprising: generating said set of output values associated with said equivalent behaviour using said inferred plurality of parameter values; and causing said articulate object to perform said behaviour.

According to a fourth aspect of the invention, there is provided a method of controlling the behaviour of an articulate object, the method comprising the steps of: assigning a value to a behavioural parameter set associated with a behavioural characteristic of the object using a behavioural design interface arranged to provide input to a behavioural controller for the object, each said behavioural parameter set comprising at least one parameter affecting the behavioural characteristic; associating each parameter in the parameter set with a parameter value obtained by performing a function on the assigned value with a default value defined by a behavioural profile; inputting the parameter value to the behavioural controller for the object; inferring from said input, output generated by the behavioural controller; associating the output with a behavioural action by the object; and causing the object to perform the behavioural action.

According to fifth aspect of the invention, there is provided a computer program product comprising a computer program, or a suite of computer programs, comprising a set of instructions to cause one or more computers to perform any one of the method aspects of the invention.

According to a sixth aspect of the invention there is provided apparatus comprising a behavioural controller arranged to generate behaviour in an object, the controller comprising: means to receive input associated with a behavioural action; means to infer a plurality of behavioural parameter values from said input in accordance with a behavioural framework arranged to generate behaviour by the object; means to derive output from the inferred plurality of behavioural parameter values; and means to generate equivalent behaviour by the object using the output derived from the parameter values.

According to a seventh aspect of the invention, there is provided apparatus comprising a behavioural design interface, the interface comprising: means arranged to allow the assignment of a value to a behavioural parameter set, the parameter set comprising at least one parameter value associated with a behavioural characteristic of the object, wherein the value assigned using the interface is provided as input to the apparatus according to the sixth aspect.

According to an eighth aspect of the invention, there is provided a device arranged to have a suite of at least one computer programs stored thereon, the suite of at least one computer programs being executable on the device so as to cause the device to function as the apparatus according to the sixth or seventh aspects of the invention.

According to a ninth aspect of the invention, there is provided a network comprising a plurality of computer-type devices arranged to be capable of communicating with each other, at least one of the devices comprising a device according to the eighth aspect of the invention, the other devices being arranged to remotely access at least part of the suite of at least computer programs, to enable objects operating within the environments of said other devices to be controlled by the suite of at least one computer programs.

According to a tenth aspect of the invention, there is provided a method of directly manipulating an object to control its behaviour, the method comprising the steps of: manipulating the object to perform a behavioural action; providing input representing the behavioural action to an output node of a behavioural framework, the output node being also arranged to provide output which is used to generate equivalent behaviour by the object, mapping the input received by the output node of the behavioural framework within the framework to derive a set of at least one parameter values for other behavioural nodes of the framework; inferring from the set of at least one parameter values derived a set of output values which will generate other equivalent behaviour by the object.

According to an eleventh aspect of the invention, there is provided a method of generating behaviour in an object under the control of a behavioural controller comprising a framework of nodes, the method comprising the steps of: at least one node receiving input associated with a behavioural action; each said at least one node mapping received input to output; inferring a plurality of behavioural parameter values for other nodes in the framework using said output; mapping the received input using said inferred behavioural parameter values to provide output by the behavioural controller which generates equivalent behaviour by the object.

According to a twelfth aspect of the invention, there is provided a method of generating behaviour in an object under the control of a behavioural controller, the method comprising the steps of: receiving input associated with a behaviour action; mapping said received input to a set at least one output values which corresponds to equivalent behaviour by the object; inferring a plurality of behavioural parameter values from said set of at least one output values in accordance with a behavioural framework arranged to generate behaviour by the object; and generating equivalent behaviour in the object using said parameter values by loading these into the behavioural controller.

According to a thirteenth aspect of the invention, a virtual environment is provided in which a plurality of virtual objects are arranged to interact under the observation of one or more users participating in the virtual environment, wherein each one of said plurality of virtual objects in the virtual environment displays semi-autonomous behaviour generated using a behavioural system using one or more inputs derived from one or more of the behavioural actions of one or more of the other virtual objects in the virtual environment.

Preferably, each user participating in the virtual environment is able to control the semi-autonomous behaviour generated by providing input to the behavioural system.

Another aspect of the invention provides a platform arranged to support the virtual environment of the above aspect, wherein the platform provides means for one of said one or more users participating in the virtual environment to provide said input.

Preferably, user provides said input via a displayed behavioural design interface, the input received being processed by a behavioural controller arranged to control the behaviour generated by said behavioural system.

The behavioural system may comprise a behavioural controller according to any previous aspect and a behavioural framework according to any previous aspect.

Advantageously, the system enables a behavioural translation device for a behavioural controller of an object to be provided, the device comprising means to map information representing behaviour conforming to a first culture to behaviour conforming to a second culture. Preferably, the information is received as input by the behavioural controller. Preferably, wherein the information is provided as output by the behavioural controller.

Advantageously, more complex behaviour may be provided by relatively unskilled users as the equivalent behaviour by the object may comprises a plurality of behavioural actions performed in a predetermined sequence. Even more advantageously, time-varying behavioural parameters may be incorporated into the behavioural controller to provide more realistic autonomously animated behaviour.

Advantageously, by having the ability to infer from input internal parameter values which can then be used to generate equivalent actions by the object, the method of generating behaviour enables relatively simple data input by a user to generate complex behaviour in the object.

Advantageously, complex behaviour may be generated which may comprise more than one behavioural action, two or more of which may be performed simultaneously. For example, the behaviour of an articulate object such as an avatar may be controlled so that both posture and eye gaze behaviours of the avatar are performed simultaneously. For example, the avatar could automatically look at an object when picking the object up, or alternatively, as another example, if an avatar is timid in response to another avatar being aggressive, the timid avatar may change both posture and eye gaze to hunch his/her shoulders and keep his/her eyes downcast.

Advantageously, the invention provides a means to enhance a chat room experience for a user by increasing the amount of expression the users can convey in the virtual medium of the chat room. The presence of body language, in particular when conveyed by the simultaneous performance of two or more behavioural actions such as posture and eye gaze, renders avatars more life-like and human and improves the quality of their communication. The invention advantageously enables a group of avatars to co-ordinate their behaviour so that each avatar reacts to the body language of other avatars in an appropriate manner.

The preferred features as set out in the dependent claims may be suitably combined with any of the above aspects in any appropriate manner apparent to those skilled in the art.

BRIEF DESCRIPTION OF THE DRAWINGS

Preferred embodiments of the invention will now be described, by way of example only, with reference to the accompanying drawings in which.

DETAILED DESCRIPTION OF EXEMPLARY EMBODIMENTS

The best mode of the invention as currently contemplated by the inventors will now be described with reference to the accompanying drawings. It will be apparent to those of ordinary skill in the art, however, that the description of the invention is by way of example only, and that the invention is not intended to be limited only to the embodiments described.

Figure 1A:
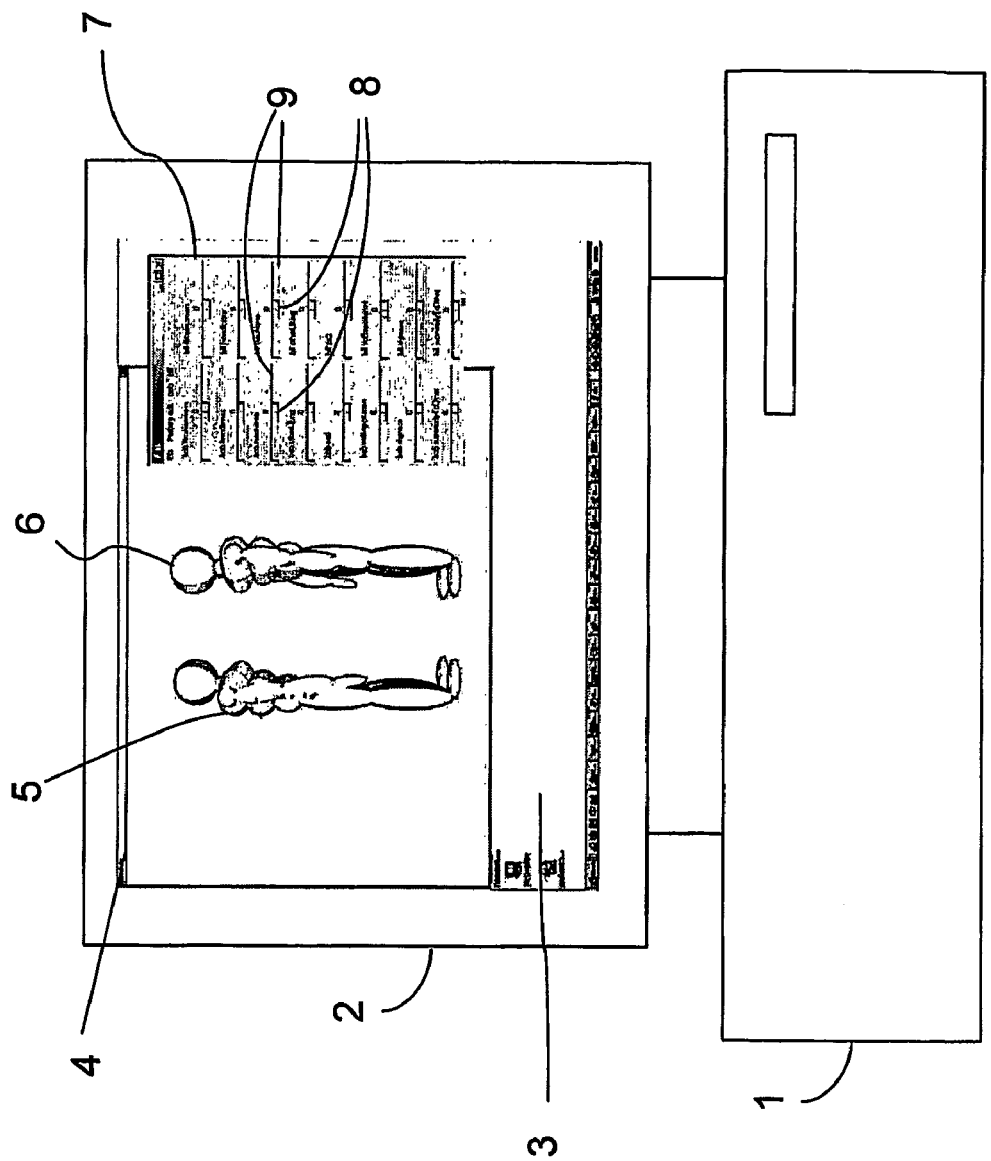
FIG. 1A shows schematically a first embodiment of the invention.

Referring now to FIG. 1A of the accompanying drawings, a first embodiment of the invention comprising a tool for generating, inferring and designing body language for avatars and virtual characters is shown. This embodiment of the invention is of particular use for controlling the behavioural characteristics of virtual objects in internet chat-rooms and computer game-type environments and the like.

In FIG. 1A, a computer device 1 is shown. The computer device 1 is assumed to be operated in use by a human user (not shown) who may not have a high level of computer programming skill. The term computer device is used to imply any device having data processing ability which can be attached to a visual display, for example, games consoles, personal digital assistants, as well as mobile-communications devices such as mobile telephones etc.

The computer device 1 is provided with visual display means 2, for example, a monitor, having display 3. Any suitable navigation means may be employed by the user to navigate the display 3, for example a mouse or keyboard (not shown). Other embodiments may include navigation tools such as styluses, track-pads, and joysticks which may be used in an equivalent manner.

Display 3 includes a window 4 within which a virtual environment application is running. A virtual environment is displayed in window 4 which contains virtual objects. For clarity, only two virtual objects will be discussed in the context of this preferred embodiment of the invention. As shown in FIG. 1A, the two virtual objects are articulated objects comprising two avatars 5,6 capable of being animated. Avatar 5 is also referred to herein as Bob and avatar 6 is also referred to as Bill. Whilst Bill and Bob have an articulated form in the embodiment shown in FIG. 1A, it is possible for the virtual objects to be non-articulated, for example, to comprise faces which contort to display emotions etc. References to behaviour therefore include facially expressed behaviour and any form of behaviour by an object, regardless of the form of the object.

Whilst virtual objects 5,6 are arranged to be capable of being animated semi-autonomously (in which case they will require at least some input from the user), it is possible for at least one of the virtual objects 5,6 to be programmed off-line to function autonomously using a behavioural controller according to other embodiments of the invention. In the context of the invention, off-line refers to programming the behavioural controller when the virtual objects are not performing animated behavioural in their virtual environment, or when such behavioural is paused or interrupted whilst off-line programming occurs before being resumed.

Returning now to FIG. 1A, the virtual objects 5,6 in the virtual environment comprise two human avatars. However, it will be appreciated by those skilled in the art that the form a virtual object may take can vary considerably depending on context. For example, depending on its role a virtual object may be an animal or any other articulate object capable of being animated. The term articulate is defined here as being composed of parts which are capable of being moved relative to each other, for example, limbs and/or joints.

Display 3 also shows a behavioural design user interface 7. The behavioural design user interface 7 comprises a separate window to the virtual environment window 4. The behavioural design user interface 7 enables a user to provide input to a behavioural controller to generate behaviour by one or more of the virtual objects 5,6. The behavioural design user interface application may comprise part of an application including the behavioural controller or it may be provided as part of a separate software application arranged to interface with an application including the behavioural controller. The behavioural controller comprises a set of connected nodes arranged according to a predetermined behavioural framework, each node in the framework mapping inputs to outputs based on a number of parameters. The behavioural controller is described in more detail herein below.

In FIG. 1A, the user has control over both virtual objects 5,6 by appropriately selecting behavioural parameter values using sliders 8 in tracker bars 9 of the behavioural design user interface. Only the tracker bar and slider for the machismo behavioural parameter set has been numbered in FIG. 1A for clarity. However, referring now to FIG. 1B, an enlarged view of the behavioural design user interface of FIG. 1A is shown.

The Behavioural Design Interface

Figure 1B:
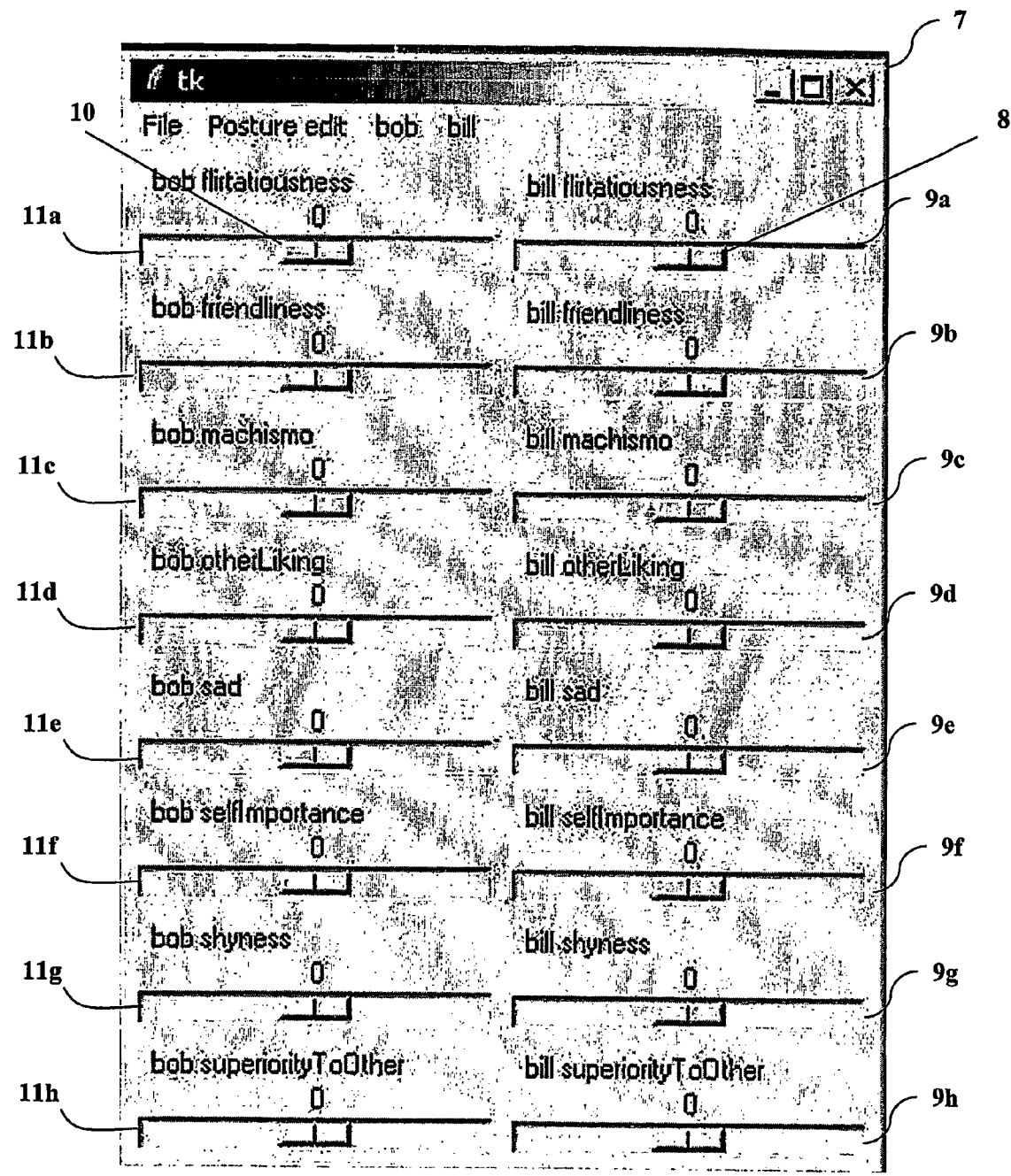
FIG. 1B shows schematically an enlarged view of the behavioural design user interface shown in FIG. 1A.

FIG. 1B shows the behavioural design user interface 7 of FIG. 1A in more detail. As FIG. 1B shows, the behavioural design user interface 7 provides a user with a range of menu choices for each of the virtual objects Bob and Bill which are interacting in the virtual environment window 4 of FIG. 1A. In alternative embodiments of the invention, the user may have less direct control over the behaviour of other virtual objects in the environment, but for simplicity, it will be assumed here that the user wishes to have direct influence over both Bob and Bill. Even where no direct control over another virtual object is provided, however, the user can still influence the behaviour of other virtual objects indirectly as will be explained in more detail.

For clarity in FIG. 1B, only slide bars 8,10 for selecting the value of the behavioural parameter set labelled flirtatiousness in tracker lanes 9a, 11a have been numbered.

The behavioural design user interface 7 as shown in FIG. 1B comprises two behavioural profiles 9a to 9h and 11a to 11h. Each behavioural profile shown comprises a set of "adjectives" or equivalently behavioural parameter sets which are associated with a particular behavioural characteristic of the virtual object. As shown in FIG. 1B, the behavioural parameter sets include flirtatiousness 9a, 11a, friendliness 9b, 11b, machismo (9c, 11c), otherLiking (9d, 11d), sad (9e, 11e), selfImportance (9f, 11f), shyness (9g, 11g) and superiorityto Other (9h, 11h).

A user can construct other behavioural profiles containing a different selection of behavioural parameter sets. It is also possible to modify the properties of each of the plurality of individual behavioural parameters which comprise a behavioural parameter set. The design of the behavioural parameter set is defined by the behavioural framework of the behavioural controller to collectively modify a predetermined behavioural characteristic. Accordingly, parameter set design is a task which requires more skill than the simple selection of what behavioural parameter sets will form a behavioural profile. The parameter set can comprise just a single parameter. For example, a global parameter whose value can affect the outputs of all behavioural nodes within the behavioural framework or an internal parameter whose value affects the output of only a single behavioural node of the framework.

Returning to FIG. 1B, the track lengths of the tracker lanes 9a to 9h and 11a to 11h represent a range of possible values a user can select by positioning the slide bars 8 or 9. It will be appreciated that only slide bars for the first flirtatiousness behavioural parameter set have been labelled in FIG. 1B for clarity. In other alternative embodiments, other value selection means may be used, for example, radio buttons, drop-down windows etc, or directly inputting control data. However, the use of a sliding bar and tracker is particularly preferred as this enables a continuous range of values to be easily assigned to a parameter without unduly distracting the user from the main screen display virtual environment window 4.

The values shown in FIG. 1B, provide the virtual objects 5,6 with a neutral stance corresponding to each displayed behavioural parameter set been assigned the value zero by the user. This is shown more clearly in FIG. 2A, which shows the neutral posture of the two virtual objects in shown in FIG. 1A and the corresponding behavioural parameter set values shown in FIGS. 1A and 1B.

Figure 2A:
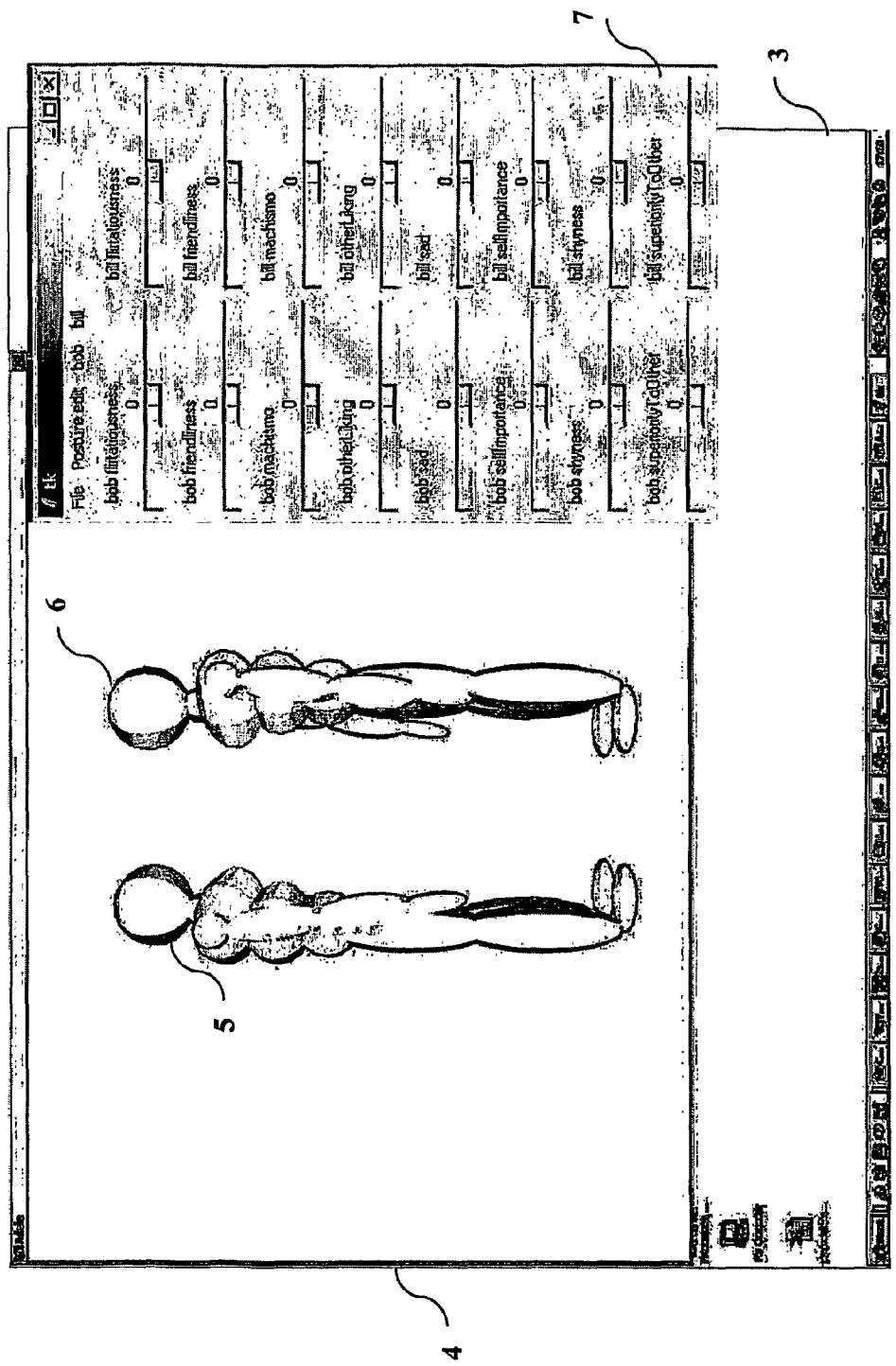
FIG. 2A shows in more detail the neutral posture of both avatars as shown in FIG. 1A.
Figure 2B:
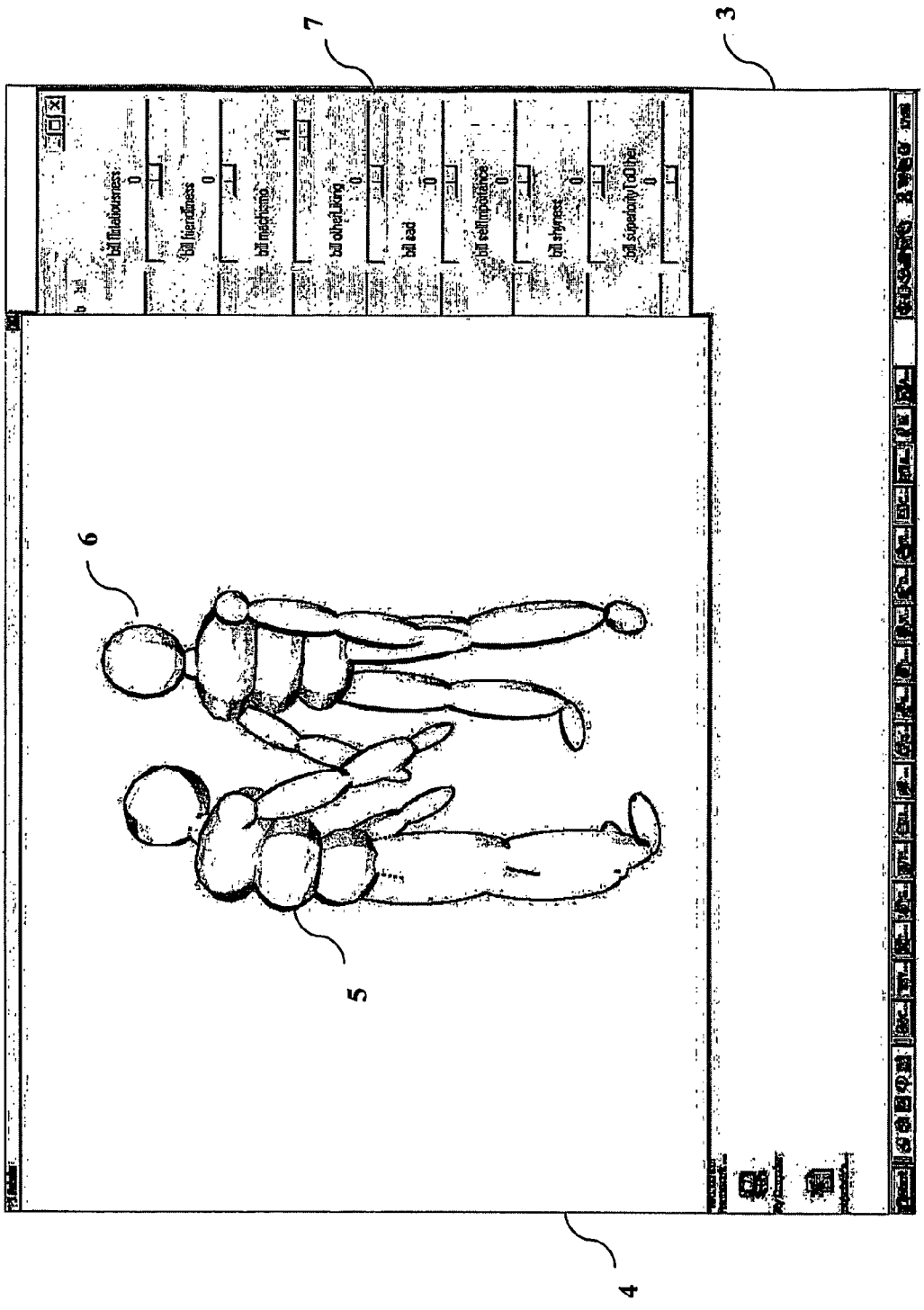
FIG. 2B shows the posture of the two avatars when the Bill avatar has a high machismo.

FIG. 2B shows how a user has directly influenced Bill's behaviour by moving the slider in the machismo tracker bar for virtual object 6 (Bill), and indirectly influenced Bob's behaviour. In FIG. 2B, the user has assigned a value of 14 using the slider in the machismo behavioural parameter set tracker lane, and Bill displays behaviour generated by the behavioural controller for Bill. The behavioural controller of Bill has inferred what equivalent machismo behaviour is required from the user input by taking this input and propagating it through the behavioural framework to assign appropriate values to the behavioural output nodes of the framework.

The behavioural controller for Bill has inferred from the assigned machismo value of 14, equivalent behavioural action which in the embodiment shown in FIG. 2B comprises Bill maintaining a machismo posture. A variety of machismo postures may result, and also other machismo behaviour such as machismo gestures, eye gaze, stance, facial expressions etc. The behavioural controller of Bill also outputs one or more values to the behavioural controller of Bob which reflect Bill's machismo behavioural action(s). This output comprises a behavioural action to be performed by Bob indicating his response to Bill's machismo behaviour.

The behavioural controller of Bob receives the input derived from Bill's behavioural action which enables Bob's behavioural controller to effectively interpret the body language conveyed by Bill's behaviour. This input can represent a behavioural action comprising a response to Bill's machismo behaviour, for example, one or more parameter values which will modify the behaviour generated by Bob's behavioural framework. Alternatively, Bob may just receive an indication of parameter values indicative of Bill's behaviour, and Bob's behavioural controller could infer from the parameter values which are provided by Bill, what output values would correspond to this response. Bob's behavioural controller is then able to infer from these output values other behavioural parameter values which in Bob's behavioural framework would generate equivalent behaviour to the response, generates output using these behavioural parameter values, and then performs this behaviour. As shown in FIG. 2A, this comprises Bob adopting a submissive posture in front of Bill.

In the manner described herein above, a user is indirectly able to modify the behaviour of virtual object 5 by changing a behavioural parameter set value for the virtual object 6. Bob has assumed a more submissive stance without the need for the user to directly move Bob's tracker bar to a submissive position. The behavioural controller for one virtual object (Bob) has interpreted the body language conveyed by the behaviour of the other virtual object (Bill). This has been achieved by the behavioural controller of the first object generating output received by the behavioural controller of the other object which conveys information indicating the body language. Suitable internal behavioural parameter values are then inferred by the behavioural controller for the other virtual object, which modifies the behaviour of the other virtual object. It will be apparent to those skilled in the art, that it is possible for the body language information to be conveyed to more than one virtual object, provided each virtual object has an appropriate behavioural controller arranged to received input.

In the embodiment of the invention shown in FIG. 2A, the parameter values of the behavioural framework corresponding to the character Bob (virtual object 6) are not directly affected by the values assigned to Bill, and as the displayed slider values for Bob do not change their values. However, in other embodiments of the invention it is possible for the slider values to be automatically updated to reflect their new values.

Figure 2C:
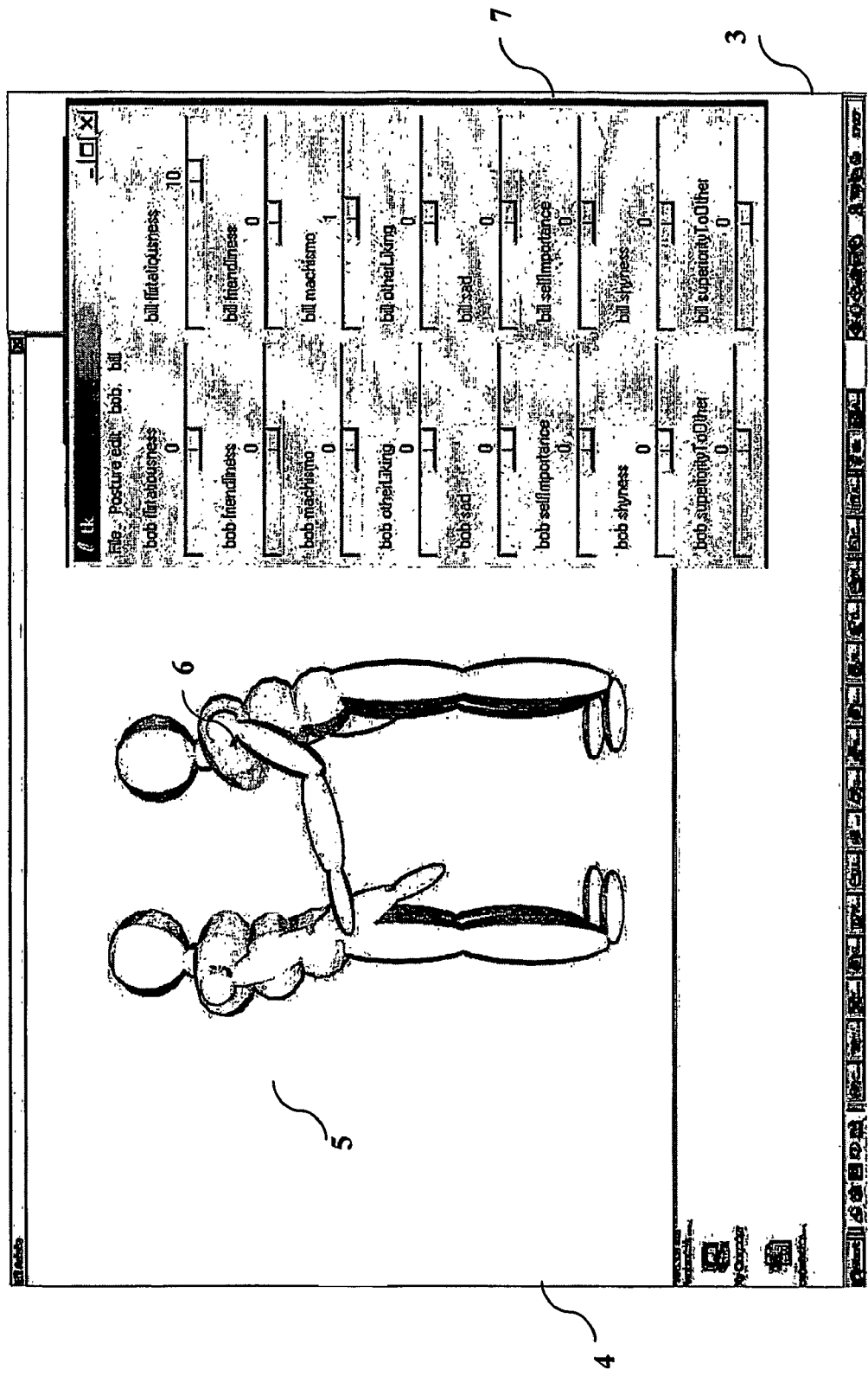
FIG. 2C shows the posture of the two avatars when the Bill avatar has a high flirtatiousness.
Figure 2D:
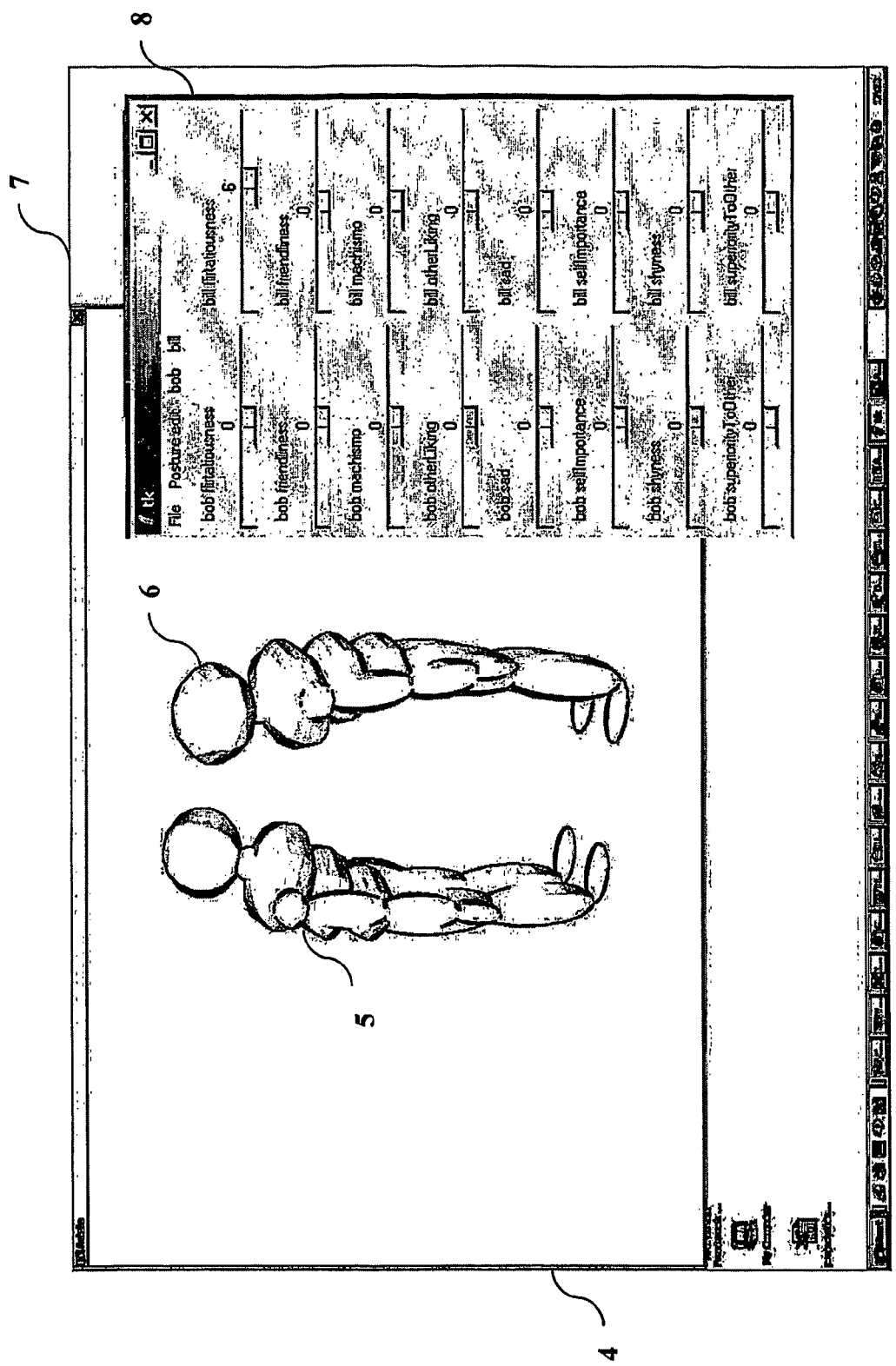
FIG. 2D shows the posture of the two avatars when the Bill avatar has a lower flirtatiousness.

FIG. 2C shows how in one embodiment of the invention, the body language of one of the virtual objects can be conveyed to the other virtual object to set up an appropriate behavioural response. In FIG. 2C, following on from the behaviour shown in FIG. 2B, Bill's user has assigned a value of 1 to machismo and has assigned a value of 10 for flirtatiousness. The behavioural controller for Bill now generates automated behaviour, such as animating Bill to reach out and touch the arm of Bob as shown in FIG. 2C. Bob's behavioural controller interprets Bill's body language as indicating he is less machismo and more friendly and that the action of reaching out to touch Bob is therefore friendly and not hostile. This can be achieved for example, by using the input Bob's behavioural controller has received to interpret the parameter values provided by Bill's controller as indicating Bill is being friendly. Consequently, instead of displaying defensive behaviour (for example) which might ensue if Bill was touch Bob in a hostile way, Bob instead adopts a less defensive posture, and leans slightly forwards, rather than maintaining a submissive posture. Seeing that Bob is less defensive, the user can now set the level of flirtatiousness and machismo for Bill to lower values, as is shown in FIG. 2D, which produces more friendly behaviour by both avatars.

As shown in FIGS. 2A to 2D, at no point does a user have to indicate specific body movements or key in text to indicate a behavioural action, the behavioural controller generates appropriate behaviour autonomously in response to the assigned behavioural parameter set values in real time.

Figure 2E:
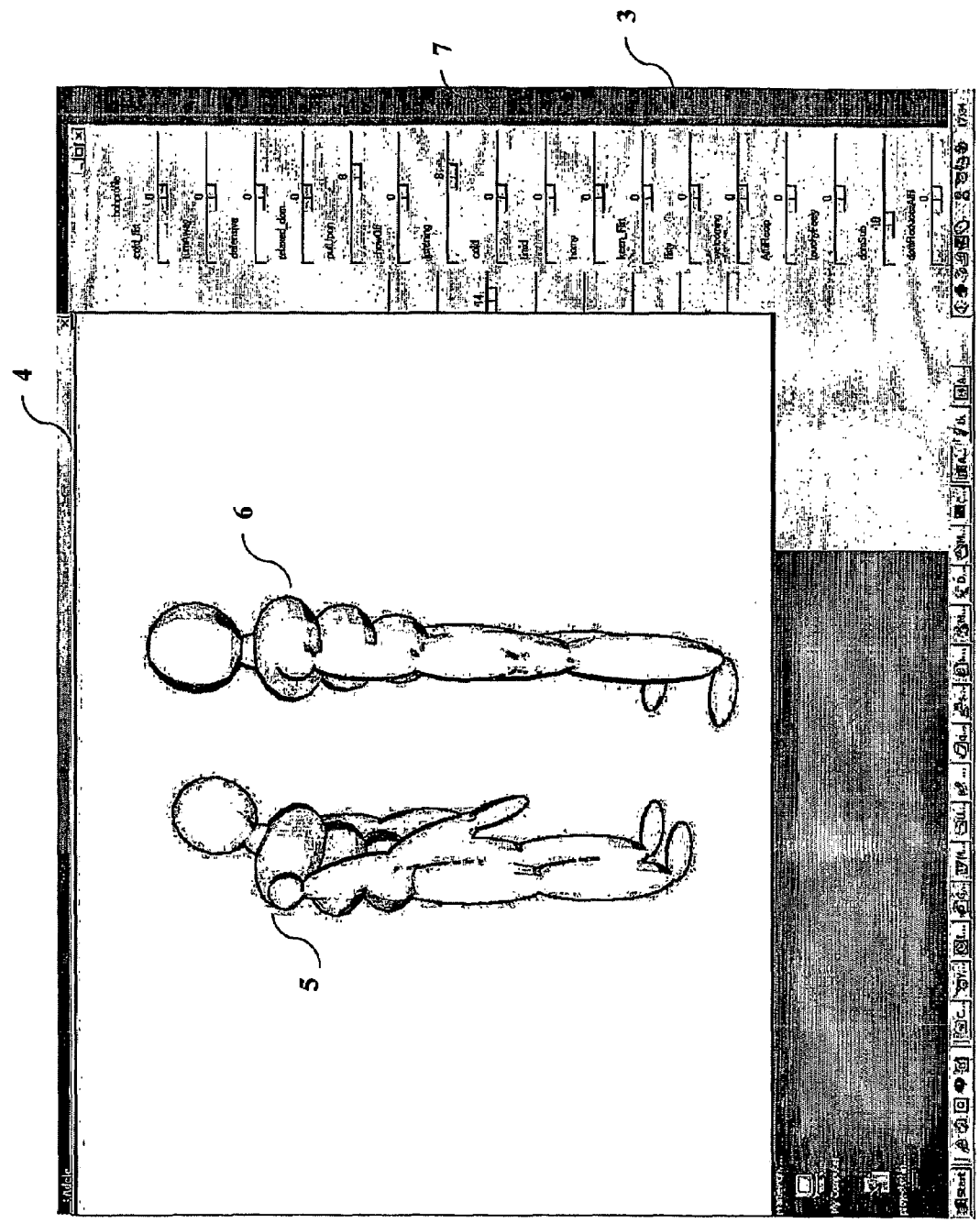
FIG. 2E shows the posture of the two avatars when the BOB avatar has high levels of being putUpon and listening, and a low level of domSub.

Advantageously, by providing the behavioural design user interface 7 as a window-type software application, the extent of the interface on view can be varied according to a users requirements. In FIG. 2E, the behavioural profile for Bob is visible in the behavioural design user interface window 7 and a different behavioural profile is shown for Bob which includes different behavioural parameter sets from those shown in the behavioural profiles in FIGS. 2A to 2D.

In FIG. 2E, Bob has been assigned by the user a high value for the listening behavioural parameter set, an equally high value for the putUpon behavioural parameter set. Other behavioural parameter sets shown in FIG. 2E include touchy-Feely, domSub, etc. Bob has been assigned a relatively low value of domSub. These values have been used by the behavioural controller of Bob to produce behaviour which is appropriate to these values, accordingly, Bill has an erect posture and Bob has a more submissive posture.

Figure 3:
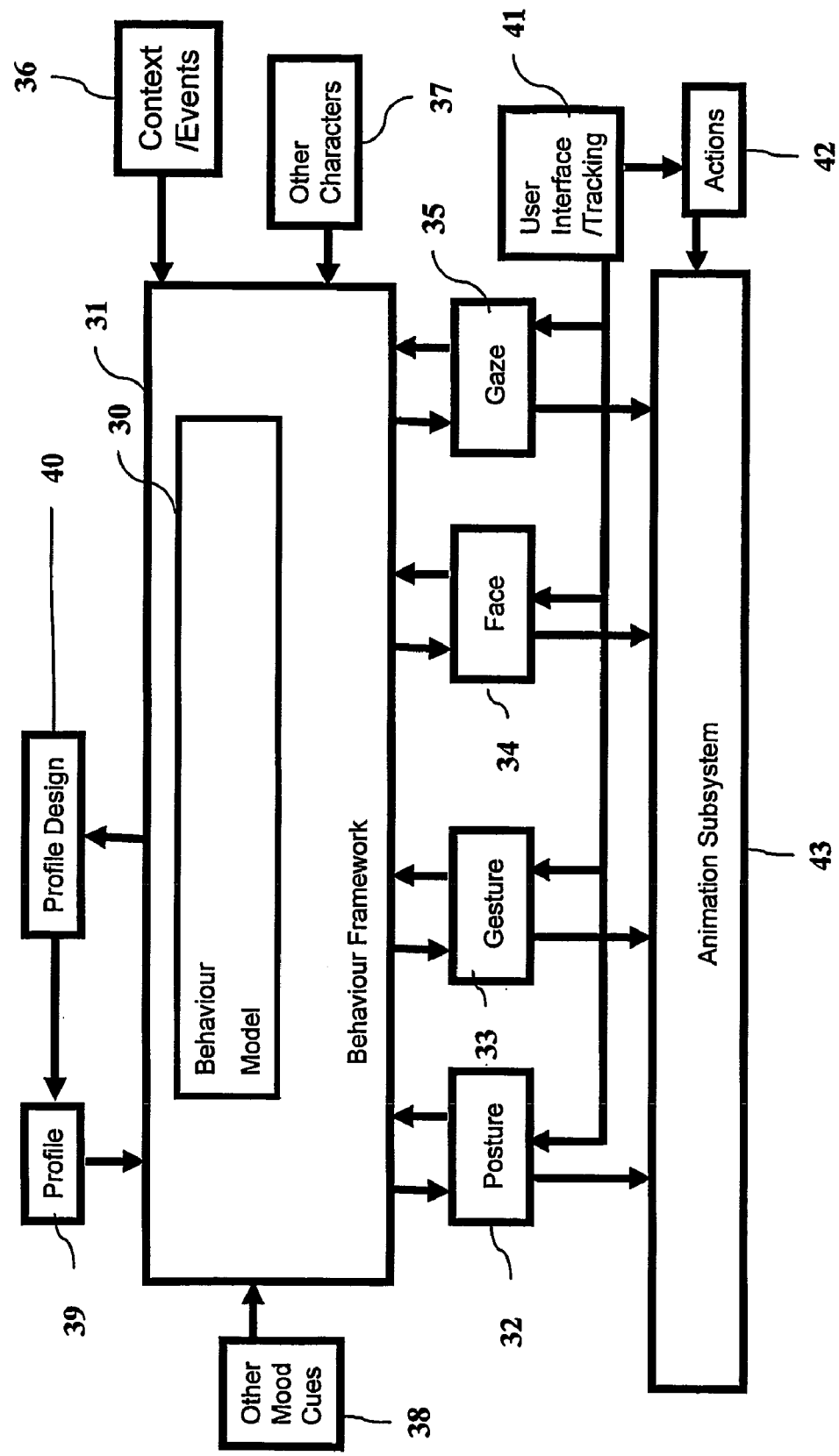
FIG. 3 shows a schematic overview of the behavioural architecture according to the invention.

FIG. 3 of the accompanying drawings shows schematically how the behavioural controller of the invention generates the behaviour of an object according to a behavioural model 30.

The behavioural model 30 defines a specific behavioural framework 31 for the object which governs how inputs received by the framework are used to generate certain behaviours such as, for example, posture 32, gesture 33, facial movement 34, eye gaze 35. The behavioural framework 31 comprises a number of nodes and is described in more detail later (see FIGS. 5 and 7 for examples of behavioural frameworks).

The inputs to the framework 31 can be derived from a variety of external and internal sources. For example, from external contexts/events 36, from other characters 37, from other mood cues 38, from a predefined profile 39. The framework 31 itself can also be used to design certain profiles 40, the resulting profiles 39 then providing input to the framework 31 to modify the values assigned to one or more behavioural parameters of the framework nodes.

Where a user directly manipulates an avatar or directly inputs values using the behavioural design user interface 41, input can be provided directly to the framework 31 by the values assigned by the movements to the posture 32, gesture 33, facial 34, and eye gaze 34 behavioural output nodes of the framework. The framework then infers appropriate values for behavioural actions and the user interface/tracking system 40 then produces appropriate actions using the animation system.

Collectively, the values output by the posture, gesture, facial, and eye behavioural nodes are used to produce appropriately animated behaviour using an animation subsystem 41. The animation subsystem used can be provided by any appropriate animation application, for example a computer game engine such as the Quake engine or a scene graph based computer graphics system such as SGI's Open Inventor library.

The Behavioural Model Architecture

Figure 4:
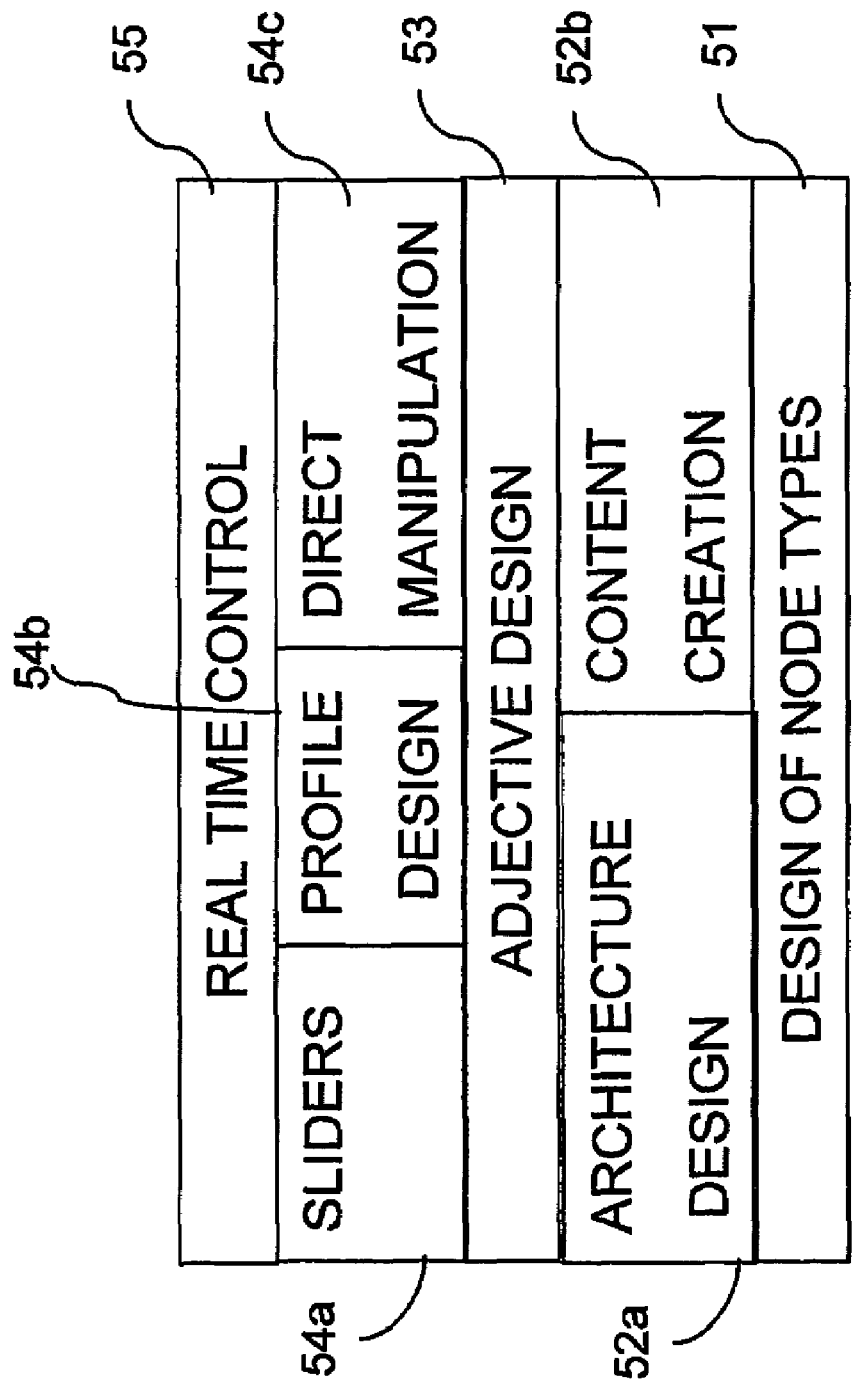
FIG. 4 shows the hierarchical layers of a behavioural model according to an embodiment of the invention.

Referring now to FIG. 4 of the accompanying drawings, the hierarchical structure of a layered hierarchical behavioural model according to the invention is shown schematically.

FIG. 4 shows a preferred embodiment of the invention in which the functionality of the behavioural model comprises five layers: a first layer which functionally relates to the design of behavioural nodes in the framework defining the behavioural model 51; a second layer which functionally relates to the design of the behavioural architecture itself 52*a* and to "content creation" 52*b* (which relates to the creation of actual animations etc. corresponding to the output behaviour, by skilled artists); a third layer which relates functionally to the design of behavioural adjectives (equivalently, behavioural parameter sets) 53; a fourth layer which functionally relates to parameter value selection mechanism, for example, as shown in FIG. 4 the slider function 54*a*, to the design of behavioural profiles 54*b*, and to the direct provision of input into the model by direct manipulation of a virtual object 54*c*; and finally a fifth layer which relates to real time control 55.

In other embodiments of the invention, more layers of complexity can be provided in the behaviour design and control architecture, however, five layers is the minimum required by the preferred embodiment of the present invention if real time control is to be supported.

The level of specialised knowledge and/or the amount of information required to interface with a layer of the behavioural model generally depends on the specific feature of the framework or function a user is seeking to modify. For example, the interface to the upper layers of the model (e.g. layers 4 and 5) require relatively little specialised knowledge on the part of a user, i.e., anyone can perform real time control of a virtual object according to this aspect of the invention. However, a user wishing to design a node type (i.e., interface with level 1 of the behavioural hierarchy) is likely to be a specialist programmer.

The behavioural model shown in FIG. 4 differs from the known multi-layered behaviour design and control architecture of Scerri & Ydrèn (see below), in both the number of layers (which increases the complexity) and the inclusion of real time control in the model (for example, see Scerri and Ydrèn [End User Specification of RoboCup Teams, RoboCup-99, Robot Soccer World Cup III, Springer-Verlag Lecture Notes in Computer Science(2000)] for more details of this simple multi-layer architecture). Other distinguishing features, in addition to having a more complex hierarchical structure, and the ability to implement real-time control functionality, include the provision of a behavioural parameter inference scheme which enables behavioural parameter values of the behavioural framework to be internally inferred from inputted parameter values. Thus, when a user inputs a set of one or more behavioural parameter values associated with a behavioural characteristic, or manipulates the object to produce a specific behavioural action, the received input can be used to generate other equivalent behaviour comprising one or more behavioural actions. This behavioural parameter inference system is described in more detail later herein below.

In FIG. 4, the design node type layer 51 relates to the design of output nodes that interface with an animation control system. Typically, the output of an output node is used by other sections of the node to animate the virtual object. The animation system contains a number of parameters that control the behaviour that it produces. An output node has one output for each parameter of the animation system and that parameter is directly set to the value of the output. For example, in the case of a posture node a new posture is generated as a combination of a set of basis postures, based on a weighting for each basis posture. The postures are blended together with a motion combination system in proportion to their weights. The posture node has an output for each posture that corresponds to its weight. Other output behaviours would have more complex mappings between parameters and behaviour. For example, an output node can be created by a programmer (generally quite skilled in their art) creating a sub-type of the node type and then, by adding the new type to the framework of the architecture at run time, the node can be used for reading in a behavioural controller definition from a file. In other embodiments of the invention, the output node adapt their output to suit the animation system being used.

A user would generally need to be trained to be familiar with the behavioural framework before modifying the architecture design 52a or content creation 52b features of layer 2 of the behavioural design model. Layer 2 comprises the framework for creating virtual objects for a particular application. It includes the design of the behavioural controller and the design of content for an output node. For example, an output node can be designed to produce behaviour that is based on pre-existing motion or other content. Many output behaviours will be based on some pre-existing animations and similar content, for example, a posture model is based on a set of pre-existing postures and a facial expression module would be based on a set of pre-existing facial expressions. These can be created by a skilled designer using commercial 3D modelling tools.

The design of the behavioural controller is typically specified by a design specification file, for example an XML file, or other suitable file-type (possibly a specially designed file-type), which can be edited by hand. As the behavioural controller has a graph structure, a simple graphical editing tool may be provided for editing the design specification file in alternative embodiments. Once the design specification file has been edited it can be complied into a controller using the behavioural framework described above.

The adjective design layer 53 and sliders 54a, profile design 52b, direct manipulation 52c, and real time control features of layers 3,4 and 5 in FIG. 4 are arranged to enable a generally unskilled user to customise the behaviour of an object. In particular, a user is able to interface with layers 3 and 4 by means of designing a behavioural profile, as described in more detail herein below with reference to FIG. 8 of the accompanying drawings.

The Behavioural Controller

Figure 5:
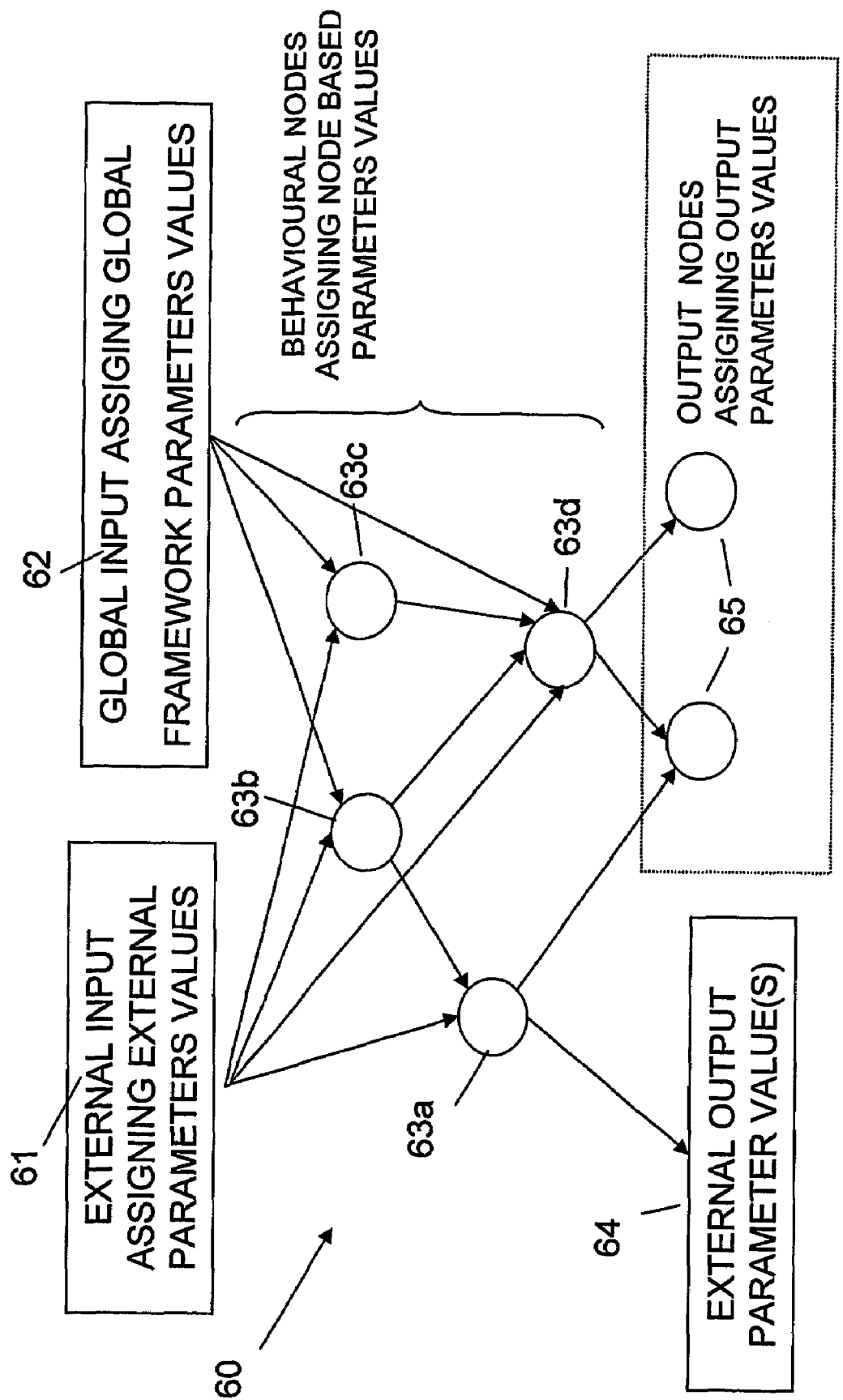
FIG. 5 is a schematic diagram of a simplistic framework for the behavioural controller for an object according to an embodiment of the invention.

Referring now to FIG. 5 of the accompanying drawings, a framework 60 of a behavioural controller for a virtual object according to a first embodiment of the invention is shown. In FIG. 5, the framework 60 of the behavioural controller comprises a number of computational nodes which map input from one or more sources to one or more outputs. The nodes within the framework 60 include nodes providing external input 61, for example, input which may be derived from the behaviour of other virtual objects; global parameter nodes 62 which provide global framework parameters and their associated input values which is accessible by all nodes in the framework (either directly or indirectly); behavioural nodes 63a, 63b, 63c, 63d, which are identified by a name and which are associated with one of more values internal to the specific node; and output nodes 64,65, which may comprise external output nodes 64 which output parameter values which can be used externally (e.g. for use by other virtual objects' behavioural controllers), or behavioural output nodes 65 which provide parameter values which are used by the behavioural animation mechanism to produce the actual desired animation of the virtual object providing the appropriate behaviour. From a programming perspective, each parameter consists of a name-value pair, e.g., a textual name with an assigned numeric value. The precise architecture of the behavioural model used will determine the form of the framework 60 of the behavioural controller.

In FIG. 5, the framework 60 comprises a number of behavioural nodes 63 a,b,c,d whose function is to map a number of inputs to a number of outputs based on a number of parameters. FIG. 5 shows schematically how external inputs 61 and global parameter inputs 62 collectively provide input to behavioural nodes 63a,b,c,d. Nodes 63a,d additionally receive input from nodes 63b,c.

External input 61 comprises high level information about the environment and other objects, for example, the degree to which an other character is being friendly, or submissive.

Global parameter input 62 comprises high level attributes of the virtual object that influence its behaviour and which modify the specific behaviour determined by each behavioural node. For example, the global parameter values may comprise a characteristic such as the mood or attitude of an object, e.g., happy or friendly. Referring briefly back to FIG. 1B, several behavioural parameter sets are labelled to indicate various global parameters, such as how friendly a character is or how shy.

Each global parameter name-value pair inputted to a behavioural node 63a,b,c,d within the behavioural controller framework generates one or more numerical outputs. These numerical outputs are then passed on as either external output by external output nodes 64 or are associated with behavioural output by output nodes 65.

External output 64 comprises information equivalent to the external input, for example how friendly or submissive the virtual object is being. Parameter name-value pairs provided as external output convey body language information. When this external output is received by other virtual object(s), it enables internal behavioural parameters of the other virtual object(s) to be inferred which modifies the behaviour of the other virtual object(s). The external output by one controller is correlated with the external input provided to the behavioural controller(s) of other virtual object(s) by matching name-value pairs having the same name.

Each behavioural output node 65 produces output corresponding to a behavioural action. From a programming perspective, a behavioural output node 65 comprises a sub-type (in an object-oriented sense) of a behavioural node 63a,b,c,d and performs a similar map of input to output to map from parameters to behaviour. A behavioural output node 65 produces output that can be used to animate the character by other parts of the output node. For example, in a posture output node, there are a set of basis posture from which new postures are generated, and a parameter for each basis posture. Actual representation of a posture is stored in terms of an object's joint angles (as Euler angles). A new posture is generated by performing a weighted sum on the angles corresponding to the basis posture using the parameters of the postures as weights. These generated angles are passed directly into the corresponding transforms in the underlying geometric representation.

The Structure and Function of Behavioural Nodes in the Framework

Figure 6:
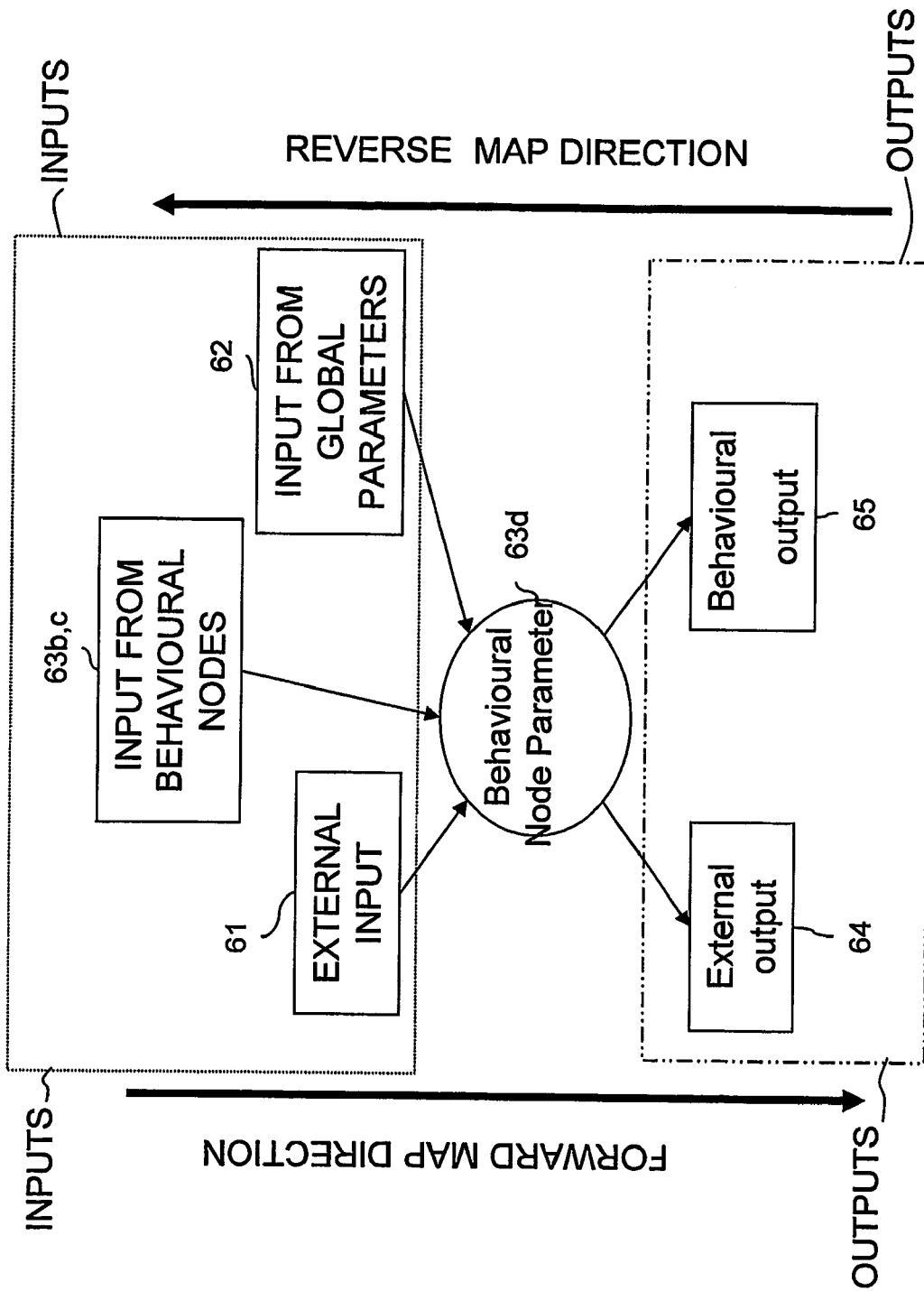
FIG. 6 is a schematic diagram of a behavioural node in the framework of an architecture such as that shown in FIGS. 5 and 7.

Referring now to FIG. 6, an enlarged view of behaviour node 63d of FIG. 5 is shown. FIG. 6 shows schematically how input from a plurality of differing sources may be used by a behaviour node. As shown in FIG. 6, behavioural node 63d is capable of receiving up to three different types of input which are mapped in a forwards direction by the behaviour node to one or more outputs based on its internal parameter set. In FIG. 6 input to behavioural node 63d can come from the output from another behavioural node, e.g. nodes 63b,c; from the input 62 provided by one or more global parameter name value pairs; and/or from external input 61 from a source outside the framework. The external input 61 may be generated by another object with which the object is interacting, according to a predetermined set of interaction rules. The external input to the behaviour node may be modified by the node. For example, input may be ignored, or limited to a maximum or minimum value if the input extends beyond an acceptable range. Alternatively, if external input represents an action performed in accordance with a different culture to that of the user, the external input may first be appropriately modified to ensure that external input corresponding to the appropriate behaviour in the user's own culture is in fact used by the framework to modify the response by the user's virtual object.

FIG. 6 also shows how a behavioural node can reverse its functionality and perform a reverse map. A reverse map is performed whenever input is received by the framework at a level which corresponds to the output of the behavioural nodes. This can occur, for example, when a user directly manipulates an object as this provides input to the framework at a level equivalent to the output to the behavioural nodes 65. This received "output" is then the starting point for a reverse map through the framework, each internal behavioural node having its parameter values inferred in a manner described in more detail later herein below, until eventually even the global parameter values for the framework which would produce the received "output" are determined.

In either a forwards or backwards direction, each behavioural node in the framework is capable to map one or more inputs to one or more outputs based on a number of parameters, according to the function of the node.

Forwards Map

In the case of the forwards map, the outputs provided by the behavioural controller for an object given as the sum of a number of terms $$O_i = \sum_j T_{ij},$$

where each term Tij is the product of a number of factors $$T_{ij} = \prod_k F_{ijk},$$

where each factor is either an internal parameter or an input of the node. As indicated above, the inputs to a node may originate as outputs from another node, be parameters assigned globally to the entire architecture or be external inputs, coming from another architecture (i.e., from another object's behavioural controller).

For example, a character could be set with a global parameter "friendliness" with a value 1.2 (indicating that the character is naturally friendly), it would also receive an external input "pleasantness" from another character with a value of 1.5 (indicating that the other character is being pleasant). These would be multiplied together in a node to produce an output "close" with a value 1.8 (indicating that the character should adopt a close posture to the other character). This output would then be passed to other nodes which might determine that the character should achieve this by combining two basis postures, leaning forward and orienting towards the other character. The weights for these two postures would be calculated from the "close" output and passed to the animation system which would generate the new posture.

Figure 7:
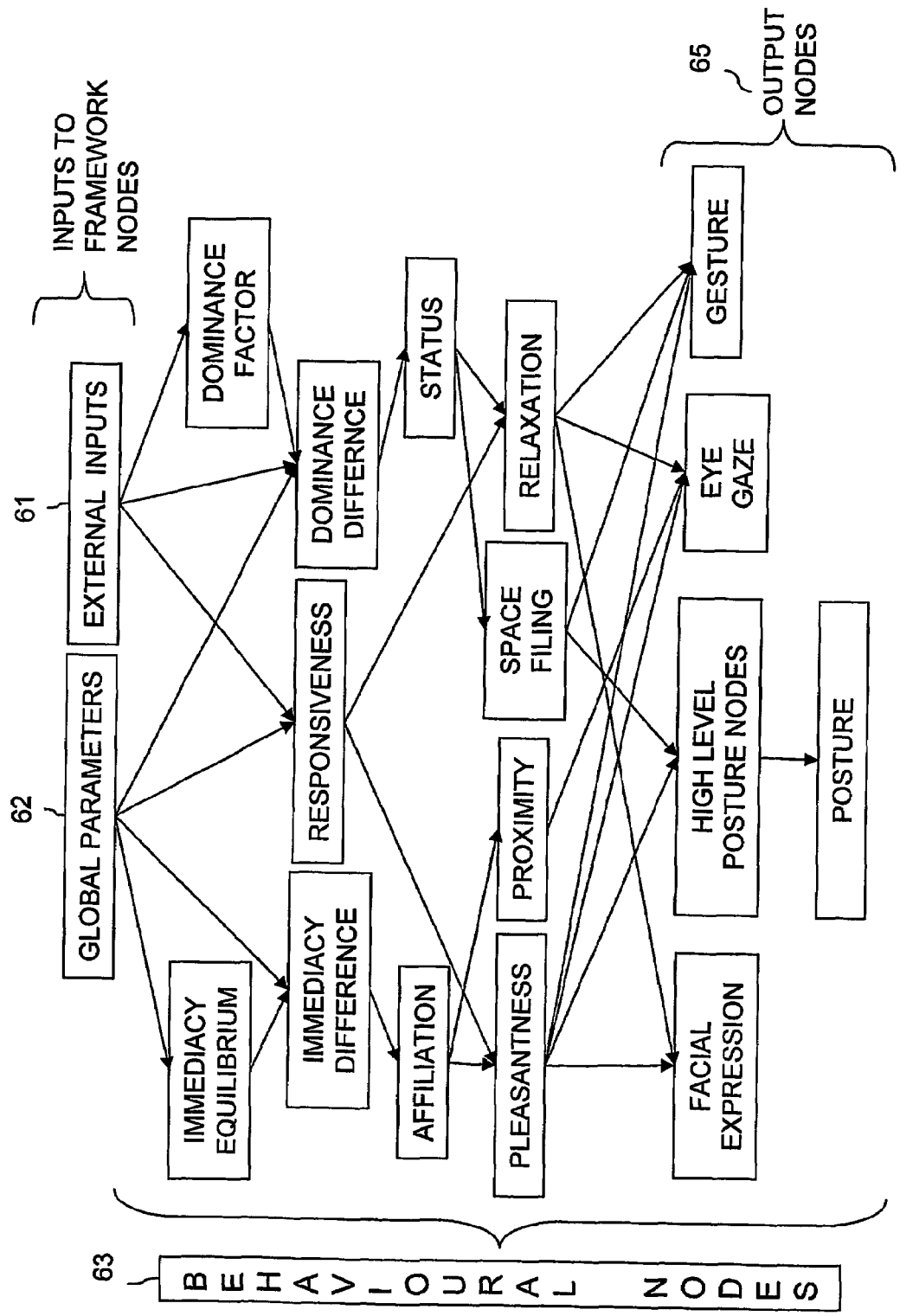
FIG. 7 is a schematic diagram of a more sophisticated framework for a behavioural controller than that shown in FIG. 5 for an object according to another embodiment of the invention.

Referring now to FIG. 7, a schematic view is provided of a framework for a behavioural controller according to a second embodiment of the invention is shown in more detail. In FIG. 7, the behavioural nodes include immediacy equilibrium, dominance factor, immediacy difference, responsiveness, dominance difference, affiliation, status, pleasantness, proximity, space fling, and relaxation. Behavioural output nodes 65 include facial expression, high level posture nodes, eye gaze, gesture, and posture. Other embodiments may include more behavioural output nodes such as speech tone, speed, accent, etc.

Whilst the complexity of the framework shown schematically in FIG. 7 is higher than the simplistic framework shown in FIG. 5, more complex frameworks may be constructed to suit specific applications and embodiments of the invention. To enable a user to modify the behaviour of an object which is generated according to its behavioural framework, a behavioural adjective comprising a set of one or more behavioural parameters is constructed as this greatly simplifies the level of input the user is required to supply.

Examples of behavioural adjectives include those shown in FIG. 1B where the behavioural profile for each virtual object 5, 6 includes the following adjectives: flirtatiousness, friendliness, machismo, otherLiking, sad, selfImportance, shyness, and superioritytoOther. Each of these behavioural adjectives comprises a behavioural parameter set, and is generally represented in the behavioural design user interface by a simple textual name or phrase. Typically an "adjective" name intuitively describes that aspect of behaviour the "adjective" modifies, to facilitate recognition by a user. Each parameter in a behavioural parameter set can be assigned an initial or default value, which can be operated on by a function, and may be operated on in conjunction with any externally inputted value. For example, the function may be a simple linear algebraic function, or simply to scale any value assigned by a user to a behavioural parameter set by a predetermined amount. Alternatively, the function may be an "identity" function, returning just the value inputted.

The framework shown schematically in FIG. 7 represents an embodiment of the invention for performing various aspects of non-verbal, intra-personal behaviour. The behavioural controller enhances interactions between virtual objects, for example, characters in an on-line meeting or computer game/chat-room scenario and can make them appear more believable. In particular, the framework is useful for semi-autonomous avatars (i.e., where the user does not specifically dictate each behavioural action of an avatar).

As many of the uses of avatars involve intra-personal behaviour, appropriate non-verbal behaviour greatly enhances their use. In FIG. 7, the behavioural controller encodes a number of intra-personal attitudes and potentially controls a number of outputs, which produce animation, such as posture and eye-gaze behaviour. The control system is based on theories proposed by Argyle (Michael Argyle (1988) *Bodily Communication* $2^{nd}$ edition, Routledge) and by Mehrabian (Albert Mehrabian (1972) *Nonverbal Communication*, Aldine-Atherton). Argyle proposes two aspects of interpersonal relations that have the greatest effect on non-verbal behaviour, intimacy and dominance-submission. These can be modelled as homeostatic motivations as described below. Related to these Mehrabian proposed three dimensions of non-verbal activity affiliation (liking), displayed in such things as smiling, physical closeness and touching, potency/status, displayed by relaxation or tension and responsiveness, displayed by general physical activation. The responsiveness dimension is optional and is not implemented in the behavioural controller shown in FIG. 7, which is otherwise based on these quantities.

In FIG. 7, as Argyle's dimensions of Immediacy and Dominance are closely associated with Mehrabian's dimensions of Affiliation and Status they are associated in the architecture. Mehrabian's dimensions are modelled as behavioural nodes that are directly determined by the Immediacy and Dominance agents. Immediacy and dominance are modelled as homeostatic motivations.

A desired value for a variable is calculated by the Immediacy Equilibrium and Dominance Factor nodes based on the global parameters of the virtual object and external inputs from any other virtual object. Factors that increase the desired intimacy include are how friendly the character is, how much it likes the other character (global parameters) and how pleasant the other character is being (external input). Factors that decrease it are how shy the character is and how dominant the other character is being. All these factors have weightings that can vary from character to character based on their profile. The desired dominance factor is a desired difference in status between the two characters which also depends on a number of other factors. The Immediacy difference would be the difference between the desired immediacy and the actual immediacy, which is determined by how intimate the other character is being (an external input) If the actual immediacy is $I_a$ and the desired immediacy is $I_d$, the immediacy difference is:

$$\Delta I = I_d - I_a$$

The equation for dominance is similar though the factors are course of different. A third dimension of behaviour responsiveness, is implemented in other embodiments of the invention.

In this embodiment of the invention, the behaviour of the character is defined in terms of high-level types of behaviour: pleasantness, proximity, space filling, relaxation. These act as intermediaries between the motivational levels of the hierarchy and the action producing levels. Pleasantness is a general pleasant demeanour such as a smiling face while the opposite might be frowning or aggressive gestures. It is an expression of affiliation (like or dislike). Pleasantness does not have many expressions in posture but an example is the "head cock" where the character tilts its head to the side when with the other character, this is normally interpreted as a friendly posture. Proximity is social distance (closeness), including physical distance but also such things as body orientation or amount of mutual gaze. Low social distance is a result of high affiliation. It is expressed in posture in a number of ways such as leaning forward or touching the other character. High social distance is the opposite and can be expressed as leaning away but also turning the whole body away. Space filing is the tendency to make oneself larger or smaller, for example, by posture or more or less expansive gestures. Examples postures include drawing up to full height or standing or sitting with legs apart. High space filling is associated with dominance, low space filling with submission. Relaxation is low bodily tension associated primarily with posture but also with other types of behaviour. High relaxation is a sign of a dominant status, and can be expressed by asymmetry of posture.

In this embodiment of the invention, there are a number of high-level posture nodes that transform high level behavioural factors into actual postures. There is one high-level posture node for each posture. Each depends on one or more of the high-level behaviour types. The values of the high-level behaviour types are multiplied by a weighting to produce the value for a posture. This determines the degree to which the character is performing the posture. The weightings depend on the characters profiles, so that different characters would produce different postures for the same high-level behaviour. The values of the postures are then passed to the posture output node. This stores the actual representation of the postures. This is a representation in terms of joint angles. The joint angles corresponding to each posture are summed using the values of the postures as weights and the result is the actual posture of the character, which is passed directly to the underlying geometric representation.

Figure 8:
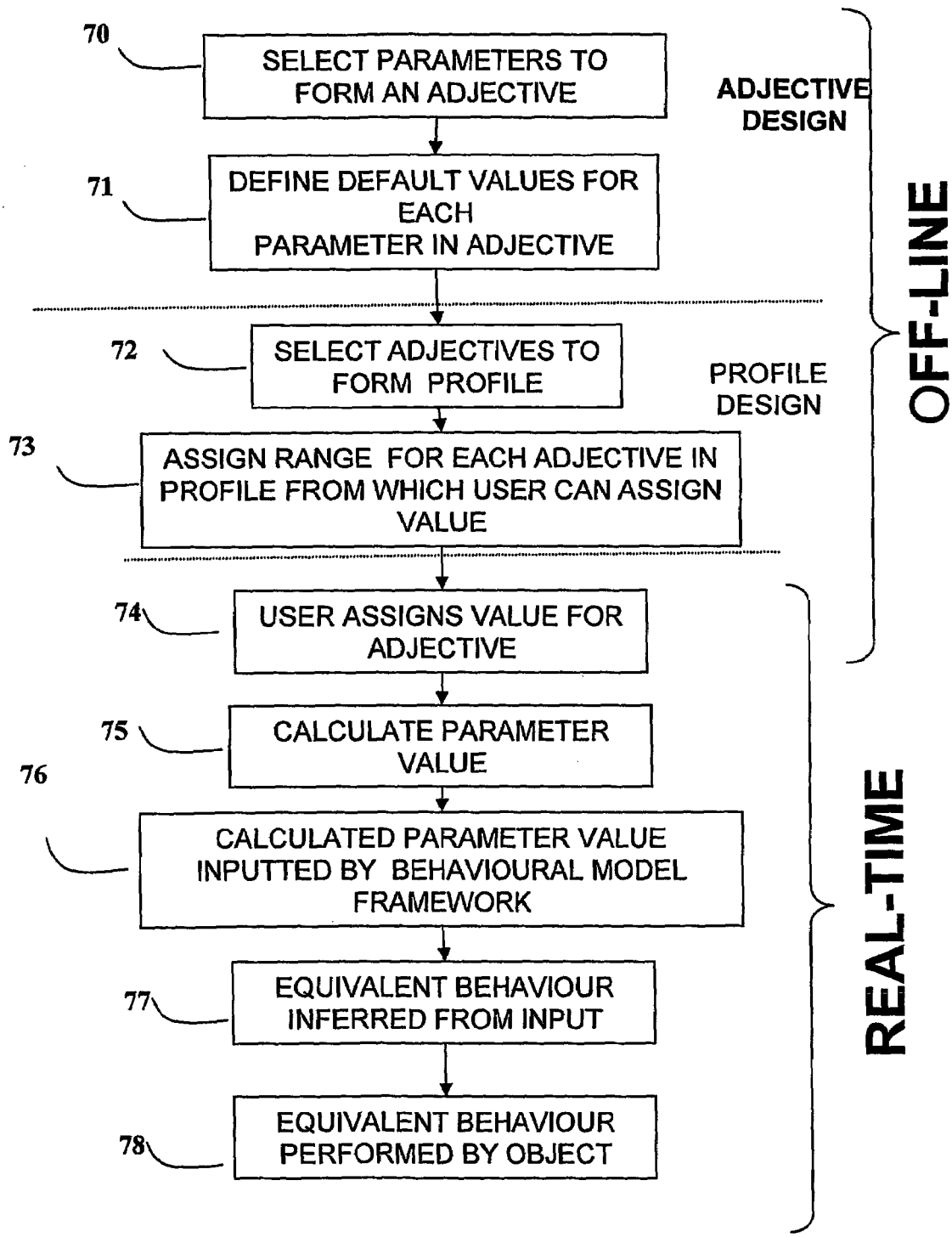
FIG. 8 is a flow diagram schematically indicating real-time steps in a method of generating behaviour in an object according to the invention, and off-line profile and adjective design.

FIG. 8 shows certain stages in the generation of behaviour of a virtual object. The stages involved are: firstly, the design of one or more behavioural adjectives; secondly, the design of a behavioural profile which comprises a plurality of behavioural adjectives; thirdly, the assignment of values to the behavioural adjectives in the profile by a user; and finally, the subsequent generation of behaviour by the behavioural controller. The adjective and profile design stages generally occur off-line, whereas the user input and generation of behaviour by the behavioural controller can occur dynamically in real-time whilst the user is on-line in the virtual environment.

In the context of the invention, an adjective comprises a set of one or more behavioural parameters. The selection of which behavioural parameters in the framework of the behavioural controller affect a behavioural characteristic is a relatively skilled task. By providing adjectives however, the amount of data and understanding required of a user of the behavioural design interface is reduced. The adjective design 70 and the selection of default values 71 to assign a behavioural parameter has already been described hereinabove, with reference to FIG. 7.

Profile Design

In contrast to the level of knowledge required to set up adjective design, the selection of which adjectives should be included in the behavioural profile of an object 72 is a less complex task compared to the level of knowledge required to construct an adjective. The design stage of a behavioural profile enables a user to select which behavioural characteristics are relevant to the behaviour of the object(s) the user is seeking to control using the behavioural design interface.

The behavioural profile therefore consists of one or more adjectives. An adjective may comprise a single global or uniquely assigned behavioural node parameter value, or a plurality of one or more of each type of parameter name-value types. In this way a user can set internal and/or global parameters for the behavioural controller. In one embodiment of the invention, the behavioural profile comprises two sections, both of which are described using parameter name-value pairs. The first section describes the overall personality of the object (the term personality is used here to represent the general disposition of the object). The second section comprises a set of attitudes name-value. In one embodiment of the invention, each adjective in the "personality" section comprises global parameter(s), whereas each adjective in the "attitude" section comprises unique behavioural node parameter(s).

Attitudes comprise aspects of the virtual object's behaviour that vary based on which other virtual objects are being interacted with by the virtual object. For example, a virtual object might be more friendly with one character than another. An attitude consists of the name of a character (or a set of characters) and a set of parameter values that are only loaded when interacting with that character. In this context, an attitude is a form of "adjective" in that it comprises a set consisting of at least one behavioural parameter name-value pair.

The attitude parameter section of the behavioural profile includes a set of at least one parameter value for each named object present in an interaction. These values are loaded into the parameters of the behavioural framework in order to generate appropriate behaviour. A set of parameter values for a class of objects, or an individual object e.g., a parameter value for objects of the class "stranger" can also be assigned to reflect the fact that the object does not like other avatars which the avatar has not encountered before.

A parameter may have its value set in any appropriate manner. Two ways are considered extremely appropriate. Firstly, a value can be directly specified by specifying a framework parameter using a node name, a parameter name, and a value to set the parameter to. Secondly, a plurality of framework parameters may be associated in a data structure already described herein called an "adjective", a term already defined herein to refers to a set comprising one or more behavioural parameters of the behavioural framework. A range of possible values a user may select for an adjective may be included in the profile design stage 73 (or alternatively it may form part of the adjective design stage).

Finally, once an "adjective" has been assigned a value by a user (step 74), the actual values of each parameter in the set are determined in step 75 and are given by as a function of the default values defined during the adjective design stage (step 73) and the value assigned to the adjective by a user (step 74).

For example, a user may assign a value of '10' to the behavioural parameter set "adjective" denoted "happy". When the behavioural profile is read into the behavioural controller, the value '10' assigned by the user for "happy" is then translated into an actual parameter value for all parameter(s) which have been determined by the adjective design (steps 70,71) to make up the parameter set "happy", the actual value being determined by a function operating on the input value which is associated with the adjective.

Which parameters collectively comprise a behavioural parameter set is determined by a profile translation file. The profile translation file defines each behavioural parameter set and associates with each an "adjective" name (or some equivalent a name or phrase for the behavioural parameter set, i.e. a name intuitively associated with the behavioural characteristic the parameter set modifies). The profile translation file also defines at least one parameter as belonging to the behavioural parameter set. In summary, the final value in each parameter used by the behavioural model is the function of the value assigned in the profile and/or the value assigned to the behavioural parameter set.

There are several ways a user can modify a profile. For example, text-editing the code, assigning a value using a slider, or by direct manipulation of the virtual object, which is described in more detail later.

Returning now to FIG. 8, the value assigned by the user to a behavioural adjective for the object is provided as input to the behavioural controller of the object. The behavioural controller then takes the input and infers from it which parameters should be assigned which values to produce suitable behavioural output (steps 75,76, 77, 78). The mechanism by which the input received is used to generate behaviour by the object is shown in more detail schematically in FIG. 9A.

Figure 9A:
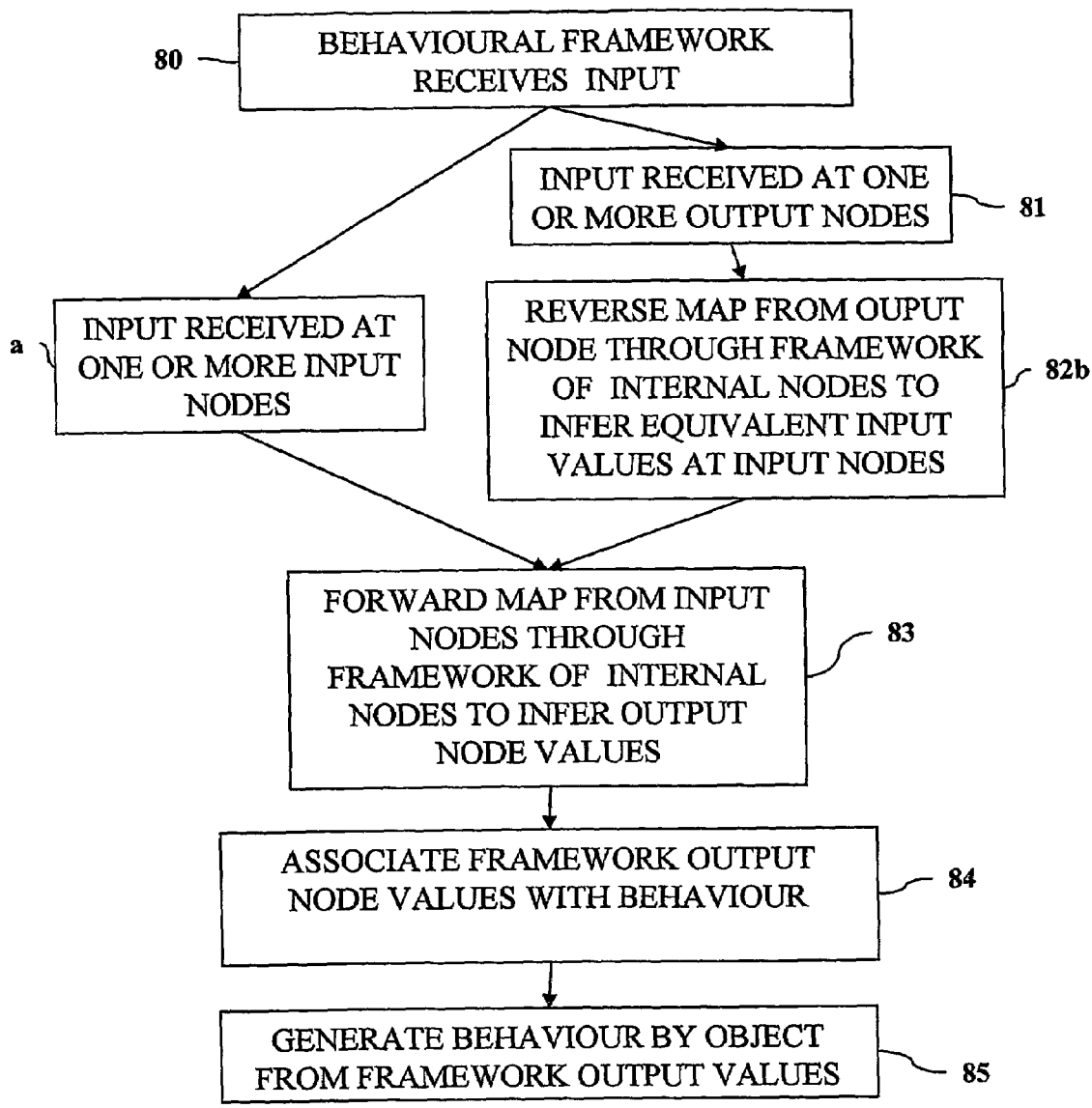
FIG. 9A is a flow diagram indicating how the behavioural framework generates equivalent behaviour according to the invention.

FIG. 9A indicates the two ways in which the framework operates. Firstly, the framework can operate using forward mappings only, which occurs when a high-level input such as an external input or global parameter or adjective is set. In this case, the framework is run forward just generating outputs from inputs at the nodes (see also FIG. 6) and doing forward mappings until the values of the output nodes are determined.

Secondly, the framework can operate to perform a reverse mapping when the outputs are changed rather than the inputs (again, see also FIG. 6). For example, when direct manipulation of an object occurs. It is also possible where a plurality of inputs are received to perform both mappings, however, the reverse mapping can affect the output by the direct mapping and so in some embodiments of the invention this is performed first.

Referring now to FIG. 9A, the behavioural controller receives input (step 81). If the input is received at an input node (step 81), for example, at a high level node in the framework corresponding to an externally input parameter or global parameter, then the input is then mapped forwards within the behavioural controller's framework of connected nodes (step 83) to produce certain output (step 83) which is used to provide values to an animation system to generate the desired behaviour (step 85). The desired behaviour comprises equivalent behaviour to the behaviour indicated at input. However, the equivalent behaviour may be more complex and/or comprise more actions, some of which may be performed simultaneously and/or in a sequence.

Reverse Map

If instead, input is received from a source such as a direct manipulation of the object, then the input received is equivalent to the behaviour which the output one or more of the output nodes of the framework would produce (in conjunction with an animation system). In this case, the input is received at one or more of the output nodes (step 81) and is first reverse mapped through the behavioural framework to determine what input values would cause such output to be produced (step 82*b*).

This reverse mapping requires all relevant nodes in the framework to have their parameter values inferred, until the global parameters which would produce such behaviour are inferred (step 84,85). These induced parameter values are retained for a forward mapping process starting from the inferred global parameter values and used to generate other behaviour. The result is that although only one action was used to provide direct input, the behaviour produced by the controller can be much richer and complex than the original directly manipulated input, and can comprise one or more behavioural actions, or even a sequence of behavioural actions. This is described again in more detail later.

Forward Map

For example, consider an embodiment of the invention where the behavioural design interface assigns values to one or more global parameters, for example, global parameters representing certain moods of a virtual object such as an avatar, as well as perhaps certain node specific parameter values, for example, representing an attitude of the avatar towards another virtual object. Referring now to both FIG. 7 and FIG. 9A, the input 62 is received by the appropriate nodes in the behavioural framework (step 82*a*) then mapped by the behavioural framework through internal behavioural nodes 63 (step 83) (for example, referring back to FIG. 7, the parameter values may be mapped firstly through the immediacy equilibrium and dominance factor nodes, and then to the immediacy difference, responsiveness, and dominance difference nodes, which then map forward to the affiliation and status nodes, and the pleasantness, proximity, space filing and relaxation nodes, until reaching the output nodes 65. In the embodiment of the invention shown in FIG. 7, the output nodes comprise the facial expression, high level posture nodes (and this further maps to posture nodes), eye gaze, and gesture nodes, each of which generates output which can be provided to a suitable animation system to cause the avatar to be animated and generate the appropriate behaviour. When the input is forward mapped through the framework, the global parameter are provided as input to other nodes in the framework, which enables secondary behavioural changes to be induced. These global parameter values thus enables more complex behaviour to be performed by the avatar.

Direct Manipulation

Figure 9B:
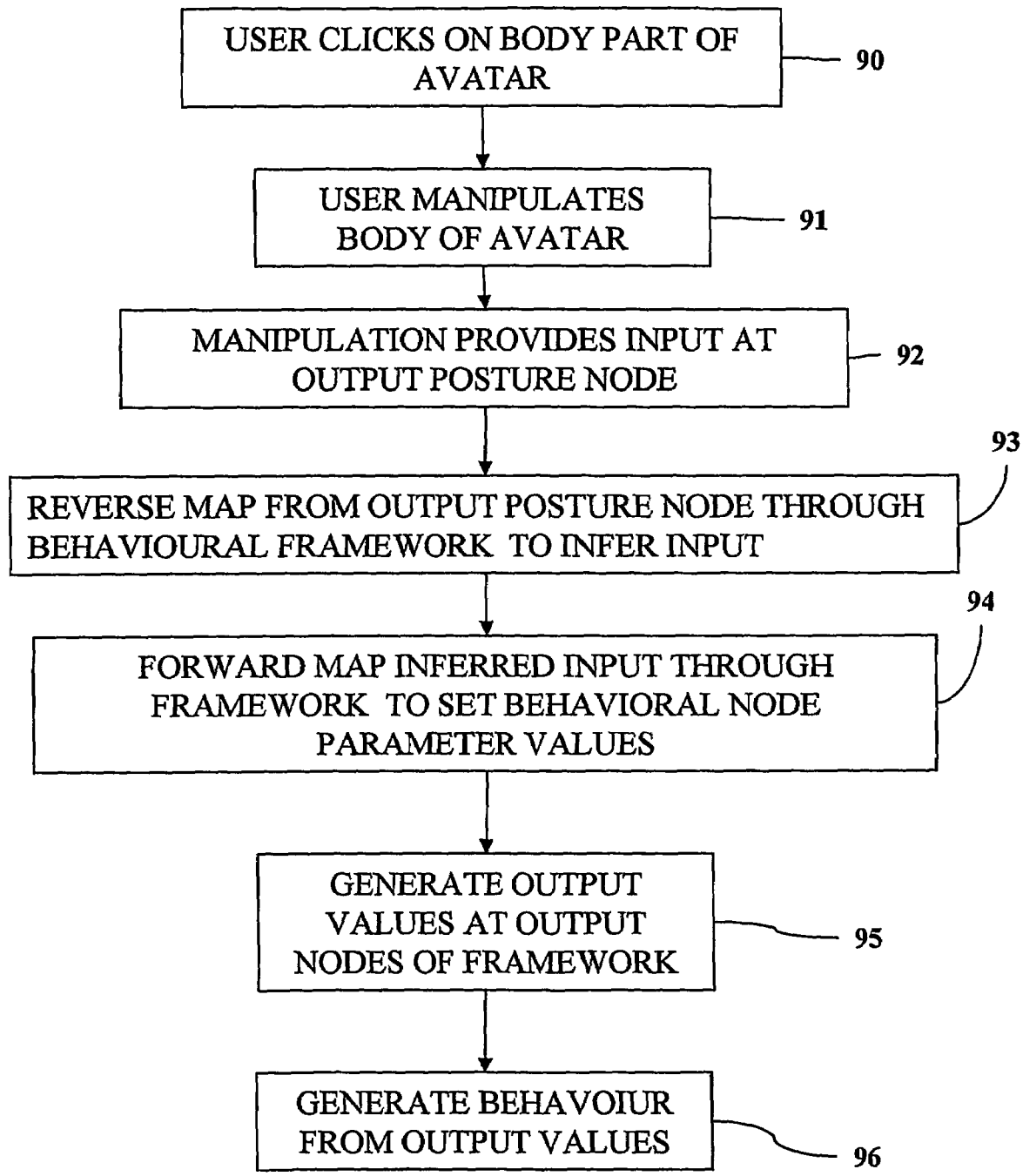
FIG. 9B is a flow diagram indicating how a user can manipulate an avatar's body movement to reassign the values assigned to specific behavioural parameters of the behavioural controller.

In the embodiment of the invention shown in FIG. 7, the output nodes comprise the facial expression, high level posture nodes (and this further maps to posture nodes), eye gaze, and gesture nodes, each of which generates output which can be provided to a suitable animation system to cause the avatar to be animated and generate the appropriate behaviour. Referring now also to FIG. 9, consider an example where a user directly manipulates the posture of an avatar (e.g., by clicking on the avatar's arm step 90) for example, to touch another avatar's arm (step 91). This generates certain input at the posture node of the framework (step 92) The global parameter values which would produce such a behaviour by the avatar may be set up to do so only when friendliness towards the other avatar is intended. The behavioural controller performs a reverse map from the values produced by the posture node (step 93) back through the relevant nodes of the framework until reaching the global parameter input nodes of the framework, where an appropriate input value for the global behavioural parameter "friendliness" can be inferred (see step 93). These global parameter values are then used to start a forwards map through the framework.

The reverse map will have also assigned values to other behavioural parameter values in the framework, for example, to pleasantness and relaxation (see FIG. 7). Running a forward map (step 94) from the inferred global parameter values, the values assigned are used to generate more output (step 95) which generates other behaviour (step 96).

For example, the values assigned to pleasantness and relaxation, can generate additional behaviour at the output node for facial expression, which results in the avatar smiling. Other behaviour such as changing the eye gaze to look at the other avatar's face may also be produced, and a gesture such as handshaking may be generated to follow touching the arm. Thus although the user has only directly manipulated the avatar's posture to touch the arm of another avatar, the behavioural controller has interpreted the body language the user has given the avatar to infer that the avatar is friendly towards the other avatar and wishes to greet the avatar, and accordingly generates appropriate behaviour.

In summary, by inferring more information from the information received as input, the behaviour generated using a reverse map can comprise one or more behavioural actions which can be performed as a sequence, or at random, and one or more behavioural actions such as eye gaze, stance, motion etc., can be performed simultaneously. This greatly increases the complexity of the behaviour shown by the object, whilst also providing a very simple control mechanism for the user. The inference mechanism is described in more detail later.

Direct manipulation can be achieved by the user directly manipulating the virtual object using a mouse to click on a body part of the virtual object and then drag to body part into a new position. Other computer navigation tools or combination of tools, e.g. a cursor and the keyboard, a joystick, a track-ball, a pointer etc, can be used in any appropriate manner as is apparent to those skilled in the art to manipulate a virtual object.

In embodiments of the invention in which a real object is controlled by the behavioural controller, the user may wish to directly change the posture of the object by hand. The characteristics of this motion, which may include displacement and or the speed of the movement, as well as its proximity to other objects etc during the motion, will determine what input is fed to the behavioural controller.

In this way, a user is able to indicate a specific desired action by a virtual object, and the behavioural framework is then able to extrapolate more behavioural actions which are consistent with the behaviour the user has indicated is desired. The new output parameter values can be used to reproduce not only the action indicated by the user but also similar motion that is appropriate to different circumstances. Moreover, the parameter settings can then be either saved to a behavioural profile or as an adjective that can then be used by a user to build a behavioural profile. The direct manipulation of an object to trigger the generation of more complex behaviour is particularly useful where the object is a toy, as a child can then easily program the toy to perform complex behaviour.

The manner in which the behavioural framework for the behavioural controller of the virtual object infers the internal and global parameters is described is now described in more detail.

The Behavioural Inference Scheme

The structure of the behavioural framework defining the operation of the behavioural controllers enables internal parameter values to be inferred from input into the framework using a reverse map, for example when a user directly manipulates the virtual object. Referring back again to FIG. 9A, consider the case where the behavioural controller receives input derived from a source external to the framework. Where the input is directly associated with output, e.g., if derived by direct manipulation, a reverse map needs to be performed to seed the global parameter values for the forward map. This reverse map is performed using the behavioural inference scheme outlined below.

An external source of input could be determined by the environment of the object. For example, the input may comprise information that another object has been thrown towards the object. Alternatively, it may comprise output from the behavioural controller of another object. Alternatively, it may comprise input from a user, for example, data provided by motion sensors attached to the user. Alternatively, it may comprise directly inputted values from a user, or input via the behavioural design user interface. The input can provide an indication of the body language of another object, in which case this information can be used to infer an appropriate response.

Once input has been received by the behavioural controller (step 80), the received input values are then associated with output values for the object (step 81). This is performed using a special purpose map for each different type of behavioural output node. Once this initial mapping has been performed at the output node a reverse map is performed through the entire framework in order to infer internal parameters of nodes and global parameters. This is achieved using an equation set up for each affected output of each node in the behavioural framework:

$$T_{ij} = \prod_k F_{ijk}$$

where each factor is either an internal parameter or an input of the node.

In this way, each term Tij of the output has a solvable factor which distinguishes it from other terms Tij in the output. The terms Tij include solvable factors which may be internal values such as an internal parameter value or global parameter value. In such circumstances, the solvable factor is simply reassigned a new value. If the solvable factor is input from another node, then the process is iterated by forming a new set of equations to represent input from the source node. The change at the output is thus propagated up the hierarchy of nodes until the solvable factor can be represented by an internal or global parameter.

Each term Tij has two solvable parameters: the first is used for solving when inferring an internal state for real time control and the other is used for profile editing.

The output of each node in terms of a solvable factor is:

$$O_i = \sum_j f_{ij} S_{ij}$$

where fij is the sum of non-solvable factors and Sij is the solvable factor. This linear equation is then solved using suitable linear algebra methods. For example, where a user has performed a number of editing functions, a sequence of linear equations exist in matrix form:

$$o = Fs$$

where o is a vector of the outputs of each of the edits, F is a matrix of non-solvable factors (which might depend on context, e.g. different settings of external inputs or time varying parameters, and s is the vector of solvable factors. As there will be more than one exact solution in all cases where F is not square, a pseudo-inverse method can be used to find a least-squares solution:

$$s = F^+ o$$

This method enables the parameters of a single node to be inferred. In order to infer parameters for nodes further up the hierarchy which are not directly connected to outputs, some of the solvable factors are provided as inputs into a node rather than internal parameters The inputs can either be external inputs, global parameters or the outputs of other nodes. External inputs are not able to be solvable parameters. Global parameters have their values set directly during the solution process.

If the input is the output of another node, the solution requires solving for the other node, which can be achieved by setting up a system of equations including that node and any nodes which provide input into that node. In this case, the additional nodes provide output to other nodes, and so the equation to be solved is best expressed in the form $$0 = \sum_j f_{ij} S_{ij} - O_i$$

each behavioural node to be determined from a given output node's output.

Real Time Control

In embodiments of the invention where the final layer in the behavioural hierarchy enables a user to provide an object with complex behaviour in real time, the user may wish to provide input to the behavioural controller from a variety of sources or to use more than one behavioural design interface for any individual object. For example, or other devices which provide input may include-using motion-trackers, for example on a user's head and/or body. Two or more control devices may be operated simultaneously by a user to reduce the operational burden. The control device used exploits the use of adjectives to set certain parameters in the behavioural model to ensure that a user does not need to constantly control all the parts of the virtual object's body but only to manipulate a limited number of parts from time to time.

The behaviour of the object, whether derived by direct manipulation or sensor tracking a user generates information which can be passed to the behavioural controller using an appropriate interface mechanism. When the information represents parameter values which are equivalent to the parameter values of certain behavioural output nodes, the behavioural controller performs a reverse map through the framework to assign values internally to the relevant parameters needed to produce that particular behaviour by the virtual object. This enables an object to generate other behaviours associated with these parameters. For example, the user might animate an object's arm to touch another character's arm such as is shown in FIG. 2C. The framework would infer that this gesture corresponds to a high value of flirtatiousness.

This would then result in other flirtatious behaviour, for example, leaning forward and smiling.

The parameter values can represent a broad behaviour pattern, such as "friendliness", which may correspond to a users behaviour in the case where trackers are used. No probabilistic mechanisms are used to infer the user's behaviour in this embodiment of the invention as the inference mechanism simply solves the algebraic equation relevant to the manipulation of the virtual object to determine what type of behaviour is being represented. Once recognised as "friendly" behaviour, the framework reproduces a wider range of friendly behaviour. This wider range of behaviour extends beyond what a user could be expected to directly control in real time, for example, a virtual object may be induced to smile by the framework, despite the fact that the user has only indicated the avatar is friendly by manipulating the avatar to give a handshake. If no input is provided, the framework enables the virtual object to continue to act autonomously. This enables a user unfamiliar with the behavioural design user interface to become more accustomed to the virtual environment and to learn about that environment without having to attempt to manipulate the virtual object right from the start. This provides a highly easy-to-use interface, suitable for even very young children.

The behavioural control system as shown in the accompanying drawings is based on an embodiment of the invention supporting non-verbal behaviour. In the general context of the invention, however, behaviour is represented by physical actions and/or vocal actions each modified by certain parameters. For example, physical actions such as body language may be modified by the current internal state of an object, e.g., whether the object is afraid. Vocal actions can be modified by parameters such as, for example, pitch. In this context, the term "behaviour" can be defined as one or more actions generated as a controlled or uncontrolled (reflexive) response to certain stimuli. Behaviour includes long term characteristic traits (for example, timid or aggressive) as well as more transient, emotional traits (for example, happy or sad).

An example of a non-verbal behaviour embodiment of the invention models an interpersonal relationship using the concepts of intimacy and dominance-submission. In this embodiment, the behavioural control system produces non-verbal activities to indicate various degrees of certain attributes such as affiliation, potency/status, which reflect the level of intimacy and dominance/submission between parties. Affiliation is represented by a suitable behavioural display, for example, by activities such as smiling, physical closeness and/or touching. Potency/status can be represented, for example by displayed relaxation or tension in posture. Other non-verbal activities that can be represented include responsiveness, displayed by general physical activation. In this context, the parameter values shown in FIG. 1B, are in this embodiment of the invention predefined emotional/intra-personal parameters such as "friendliness" and "otherLiking" corresponding to affiliation or "machismo" or "selfImportance" corresponding to dominance.

Other Embodiments of the Invention

The embodiments described herein above primarily describe a virtual object's behaviour being controlled. However, the concepts of behavioural control described herein readily extend to the control of non-virtual, i.e., real or tangible objects, even when not explicitly described in the above description, and the invention according extends to the behaviour of both real and virtual objects as will be appreciated by those skilled in the art.

The above embodiments of the invention have had behavioural frameworks which are essentially static. In a static framework, once a parameter value has been set by a user it remains set to that value so until reset. More autonomous animation can be produced by varying the parameters over time. In order to produce real animation, the framework is modified to include time varying parameters.

Different types of time varying parameters can be supported by a behavioural framework. For example, a randomly varying parameter could provide occasional posture shifts while a different type could produce more predictable animations. Such parameters would require more sophisticated techniques for performing a reverse map, and so are not contemplated in the best mode of the invention. By controlling the alteration of any timings of parameter changes, however, more realistic posture shifts may be obtained.

Another animated embodiment of the invention requires the provision of a number of profiles, which would be changed between or interpolated over time. This would alter a set of parameters in one go. One way of implementing such an embodiment of the invention is to provide profiles as key frames in an animation sense and interpolate between them. Another way of implementing more animation is to control the character using a finite state machine system where each state has a profile attached. The states would change due to events in the world or internal factors of the character and when a new state is entered its profile is loaded.

Other embodiments of the invention have other types of output node. For example, in one embodiment of the invention, it is possible to provide only a posture node as an output node. This output node provides a simple mapping from parameters to behaviour, a parameter exists for each posture and the values of these parameters provide an interpolation between the postures. This model could be applied to other types of behaviour, for example, pieces of motion could be interpolated in the same way. More complex behaviours will, however, requires more complex mappings, which increases the complexity of the mappings backwards from behaviour to infer internal parameters.

There are various approaches to this problem. The first is to ignore it and have some output nodes that can produce behaviour forwards but not be solved for. This is a feasible option as long as there are other types of behaviour that can be controlled. Some aspects can be ignored as they are too hard for a user to control, for example, eye gaze. Another approach is to provide a hand crafted mapping for each type of output node. This is time consuming. The final way would be to use some sort of learning scheme to learn a mapping, for example, Bayesian or neural networks.

One embodiment of the invention combines a finite state machine extension and a probabilistic Bayesian network extension. Each node in the network has a number of states in this embodiment, each state having different internal parameters settings and as such different mappings between inputs and outputs. In this embodiment, the probability of a node being in a given state would depend on the states of the other nodes, and global parameters or the outputs of other nodes. The framework then has two different types of interrelations between nodes. One is continuous as in the current system with continuous valued parameters going between nodes. The other is discrete with nodes being one of a set of discrete states. Both types of information are given equal importance, as some behavioural features are naturally discrete, whereas other behaviour is not. For example, one can either cross one's arms or not, and one is either in a conversation or not, 50% of either case being not very meaningful. However, other behavioural features are naturally continuous, for example, an object should be able to vary continuously between being happy and being angry over time and not do so as a sequence of discrete steps.

Different methods are suitable for inferring each type of information in such embodiments of the invention. The framework presented here is good for continuous data without uncertainty, whereas Bayesian networks can infer the probabilities of a set of discrete states. In some embodiments of the invention, an extension to the behavioural framework enables both methods for inferring information to be combined.

The method described hereinabove with reference to the accompanying drawings is non-probabilistic and can be used to infer the continuous state when the state of each node is known. In other embodiments of the invention where both inference methods are combined, then a Bayesian network can be used beforehand and node states and their probability relationships between them can be treated as a Bayesian network and used to infer the states of each node from the output. The topology of the network would remain the same whether it is treated as a Bayesian or continuous network. Once these elements are in place the internal parameters of the system can be learned automatically from data of peoples behaviour.

In other embodiments of the invention, the methods described above for designing profiles can be extended to large numbers of examples to learn a set of internal parameters that are based on real data. Bayesian learning techniques can be used to learn probability relationships. With this the parameters of the system can be based on data from real people and so can more accurately reflect people's behaviour which is very hard to capture theoretically.

An embodiment of the invention in which users interact via an on-line chat room is now described. In this embodiment, users are allowed to express themselves with body language as well as text providing input to the behavioural controller. This is also suitable for embodiments of the invention such as on-line counselling where an avatar represents a human counsellor, as well as other virtual environments such as on-line mediation, on-line meetings (i.e., where information is to be exchanged by a group of virtual objects), on-line collaborations (i.e., where a task is to be performed by a group of virtual objects), and on-line commerce environments (e.g. avatar sales rooms).

The body language comprises behaviour generated autonomously by an architecture designed within the framework described, by using a set of predefined emotional/intra-personal parameters from a profile to generate the behaviour. The user accesses the system using a standard desktop PC. Computer navigation devices used by the user to provide input to the behavioural controller are limited to those commonly available in such an environment, for example, a mouse and keyboard. The keyboard is used to input text and the mouse can be used to control the characters motion. As the user will mostly want to concentrate on typing text the control of the characters movement will be occasional. One input (e.g. via the behavioural design user interface) will result in a correction to the characters overall behaviour rather than a single motion, thus making most use of a small amount of user input. This is easily achieved by inferring the emotional/intra-personal parameters from that input. More direct input of the avatar's emotions is done through the "emoticons" used in current graphical chat systems. These can directly set global parameters.

Another embodiment of the invention extends the above embodiment by further including input provided by the motion of the user. For example, home computer often have cheap video camera's, which can be arranged to perform face tracking through a specialised output node that provides input to the behavioural controller, the input being used to infer the user's state.

Embodiments of the invention described hereinabove allow a user to customise the behaviour of their avatar, by allowing them to edit their avatar's profile. For the end user this would have to be done in as user friendly a way as possible, and the embodiments shown in FIG. 1A to 2E is particularly suited to editing adjectives using the set of sliders provided by the behavioural design user interface.

The invention has many applications, including international avatar conferencing, which can be implemented in a manner similar to that for a chat room. In this case it is more important to capture the actual body language of the participants, particularly for business negotiations. This could be done by having more sophisticated body-tracking systems, including high quality face tracking the user. Other cues such as tone of voice could also be used to infer the state of the user. The framework of the behavioural controller can be made more complex to ensure each user's behaviour is correctly inferred.

Behavioural Translation

The inference scheme described herein above enables a model of the internal state of a virtual agent or avatar to be determined which extends the application of the behavioural controller to include the ability to translate between differing cultural behaviours. For example, in the case where the avatar is functioning as a personal virtual agent for a user who is interacting with users from different cultural backgrounds in an on-line environment such as a web-meeting, the ability to directly represent the user's actual movements and emotions may not be desirable.

Such embodiments of the invention may be modified to include translating the behaviour by the behavioural controller at either the input or output stages. This could be achieved by generating the external outputs using a behavioural framework corresponding to one culture and recreating the behaviour from this external output using a different framework corresponding to the other culture. Otherwise the two frameworks could be the same but could use different profiles corresponding to the different cultures.

This can also be achieved by including a translation element which enables input received by the behavioural controller associated with a behavioural action corresponding to a first culture to be first translated into input associated with an equivalent behavioural action in a second, differing culture. Similarly, it is possible to implement a translation element which receives the output from the output behavioural nodes of the behavioural controller corresponding to behaviour according to the second culture and translates this back into the first culture.

The translation element can be provided within the controller to implement the translation of body language from one culture to another. One mechanism by which this can be achieved is by high-level parameters representing the meaning of a piece of body language being used with different profiles to generate different body language in different cultural contexts. This would ensure that other observers would perceive the participant's avatar's body language in their own culture. Thus a certain behaviour would input into the system by an observer of culture A, and would be interpreted as a friendly behaviour by the profile corresponding to culture A. The friendliness parameter would then be passed to a machine set with a machine containing a profile corresponding to culture B. This machine would generate a different behaviour but one which would have the meaning of friendliness in culture B.

In embodiments of the invention arranged for use in a computer game environment, expressive body language can be generated and also inferred from the users commands for their character, what the internal state of their character is. The user input could be done a number of ways, for example, as described hereinabove, the user could directly manipulate the posture of the character. Alternatively, larger scale behaviour can be used for inference, for example, choice of action, whether to talk to some one or the words chosen. Once the global parameters for the behavioural framework have been inferred, the characters in the game can be made to react to these. Advantageously, the invention provides a behavioural design tool which enables game designers to have fine control over the design of the behaviour of the characters using powerful yet intuitive tools.

In embodiments of the invention where the object needs to perform a role, the profile a user creates using the design interface can be used to ensure behaviour is appropriate to the role and that any inference of internal state reflects the role of the object whose behaviour is inferred.

Robotic Applications

Whilst the embodiments described above are particularly relevant for virtual environments, the concept of providing a user with a simple input device to interface with a behavioural controller capable of generating complex, on-going behaviour has applications in the real world, in particular, for example, with robotic toys. Accordingly, other embodiments of the invention provide a simple mechanism for a user to generate complex behaviour in a robotic object, particularly an articulate robotic object, such as a toy doll.

Such embodiments can enable a child, for example, to provide a robotic pet or toy with a sophisticated character whilst requiring only manipulation of the intuitive labels assigned to the behavioural profiles. In such applications, the behavioural design user interface may be provided as a remote control type device. Behavioural control information can then be provided wirelessly to instruct appropriate action by the robotic device. The behavioural controller may be provided either as part of the interface device, with animation instructions only transmitted to the robotic device, or as part of the robotic device itself, or as part of a proxy device which then relays behavioural instructions on to the robotic device.

In other embodiments of the invention, robotic devices used in manufacturing or production line contexts may similarly require their behaviour to be controlled using a hierarchical behavioural model framework such as is described herein, and the behavioural design user interface may present behavioural options which are more role specific depending on the task the robotic device is to perform. Such robotic devices may be controlled remotely either by wired or wireless connections depending on their context. For example, in a production line, the robotic device may be controlled via wired communications links, whereas in an underwater environment, a sub-sea robot may require a wireless communications link and/or a wired communications link.

Advantageously, the invention provides a simple to use behavioural design interface over complex robotic behaviour, which is particularly important in applications where the robotic object has to perform a time-critical task with some level of autonomous/semi-autonomous behaviour that requires real-time control by the user.

It will be apparent to those skilled in the art that the invention can be implemented by an appropriate combination of hardware and/or software, and the combination of hard and software is not intended to be limited by the specific partition described hereinabove. Moreover, it is possible for the invention to be implemented by a suite of one or more computer programs running on one or more devices. The devices may be distributed across a communications network.

In embodiments of the invention where the behaviour of an entity in a virtual environment is being influenced by the presence of one or more other entities in the virtual environment, it will also be apparent to those skilled in the art that it is possible for an aggregate effect of the other virtual entities to be determined and for the aggregate effect to be used as high-level input to the behavioural controller of the entity which is then influenced. This can occur even if one or more or even all of the other entities in the virtual environment which are influencing the avatar are not present to an observer of the avatar whose behaviour is being influenced. For example, if an avatar is teaching a group of other entities, and the other entities indicate they are bored by their behaviour, the avatar performing the teaching may adopt more animated behaviour and/or increase their tone variation and loudness to raise the interest of its audience in an autonomous manner. This would enable a user to maintain interest in an on-line meeting for example, even if the speaker was not able to directly observe all of their virtual audience. Typically, an aggregate effect will be determining by processing the outputs provided by the behavioural controllers of the other entities according to a processing scheme prior to providing the processed output as input to the behavioural controller of the entity whose behaviour is being influenced. For example, an average parameter value for each output provided by one or more of the other entities may be determined (although not all entities may contribute to any particular parameter value) prior to being used as input to the behavioural controller of the entity whose behaviour is being influenced by the other entities.

The text of the abstract is reproduced below as part of the description:

A hierarchical behavioural framework is used to generate and control autonomous and semi-autonomous behaviour in an articulate object. A behavioural controller is arranged to receive input associated with a behavioural action, to infer a plurality of behavioural parameter values using the framework, and to generate equivalent behaviour in the articulate object using the parameter values when loaded in the behavioural controller to generate output corresponding to the equivalent behaviour. The equivalent behaviour may reproduce the inputted behavioural action, and/or comprise one or more other behavioural actions, which may be performed simultaneously or as part of a sequence of actions.

What is claimed is:

1. A method of generating behavior for an object under the control of a behavioral controller comprising a framework of nodes, said method comprising:
   at least one node being arranged to map its input to provide output to other nodes in both a forwards and backwards direction through said framework of nodes and at least one node being arranged to assign a global framework parameter value;
   receiving input associated with one or more behavioral actions;
   inferring for a plurality of behavioral nodes in said framework, a behavioral parameter value for each behavioral node from said input in accordance with said behavioral framework;

inferring from each of said behavioral parameter values, one or more global parameter values for one or more global parameter nodes in said framework;

mapping said global parameter values in a forwards direction through each node of said framework;

deriving output from the inferred plurality of behavioral parameter values for behavioral output nodes of the behavioral framework; and generating equivalent behavior by the object using the derived output.

2. A method as claimed in claim 1, wherein the framework has an internally flexible structure.

3. A method as claimed in claim 1, wherein the framework comprises a hierarchy of behavioral nodes, at least one behavioral node being arranged to receive input from a plurality of differing sources taken from the group of:

input provided from one or more output nodes of another framework;

input comprising a parameter value from another behavioral node; and input comprising a global parameter value of the framework indirectly or directly provided by a global parameter node.

4. A method as claimed in claim 1, wherein the framework is dynamically flexible.

5. A method as claimed in claim 1, wherein input received is associated with a plurality of behavioral actions, and each inferred parameter value is determined by a combination of said plurality of behavioral action inputs.

6. A method as claimed in claim 1, wherein the input comprises a set of at least one behavioral parameter value directly associated with output which generates the behavioral action, wherein in the step of inferring, at least one or more other behavioral parameter values are inferred by performing a reverse map through the framework from which further output is derived to generate additional behavior to the behavioral action.

7. A method as claimed in claim 1, wherein said framework comprises a plurality of behavioral nodes associated with a function operating on one or more parameter values to provide output which modifies a characteristic of the behavior of the object, wherein the function operates on at least one global behavioral parameter associated with a mood state of the object, wherein whereby the behavior of the object provided by output from an output node of the framework is modified to indicate the mood the object is in.

8. A method as claimed in claim 1, wherein the framework comprises a plurality of behavioral nodes associated with a function operating on one or more parameter values to provide output which modifies a characteristic of the behavior of the object, wherein the function operates on at least one behavioral parameter value assigned uniquely to a behavioral node of the framework and wherein the output generated by a behavioral node of said framework from said input uses said function to operate on an internal parameter value associated with a personality trait affecting a characteristic of the behavior of the object.

9. A method as claimed in claim 1, wherein the equivalent behavior by the object comprises a plurality of behavioral actions performed in a predetermined sequence.

10. A method as claimed in claim 9, wherein the plurality of behavioral actions are performed over a period of time.

11. A method as claimed in claim 9, wherein one or more of said plurality of behavioral actions are performed simultaneously.

12. A method as claimed in claim 1 wherein the behavior includes a behavioral action taken from a group including: eye gaze, limb movement, speech, stance.

13. A method as claimed in claim 1, wherein the received input is derived from a behavioral action by the object which has been induced by direct manipulation of the object by a human user.

14. A method as claimed in claim 1, wherein the input is received by an input node and is derived from a behavioral action by one or more other objects interacting with the object.

15. A method as claimed in claim 1, wherein the input is received by an input node and includes input associated with a behavioral action performed by a user of the behavioral controller.

16. A method as claimed in claim 1, wherein said step of receiving input associated with one or more behavioral actions comprises:

assigning a value to a behavioral parameter set associated with a behavioral characteristic of the object using a behavioral design interface arranged to provide input to the behavioral controller of the object, each said behavioral parameter set comprising at least one parameter affecting the behavioral characteristic;

associating each parameter in the parameter set with a parameter value obtained by performing a function on the assigned value with a default value defined by a behavioral profile; and inputting the parameter value to the behavioral controller for the object;

wherein said step of generating equivalent behavioral by the object using the derived output comprises associating the output with a behavioral action by the object; and causing the object to perform the behavioral action.

17. A method as claimed in claim 1, wherein the framework comprises a hierarchy of behavioral nodes, wherein each behavioral node is arranged to provide output through external output nodes to the input nodes in a behavioral framework of another object and to provide behavioral output through behavioral output nodes enabling the behavior of the object to be animated.

18. A behavioral controller arranged to generate behavior in an object, the controller comprising:

a framework of nodes, the framework comprising at least one node arranged to map input to output in both a forwards and backwards direction through said framework of nodes, at least one node arranged to assign a global framework parameter value, and a number of computational nodes for receiving input associated with one or more behavioral actions; and wherein the framework is arranged to:

infer for a plurality of behavioral nodes in said framework, a behavioral parameter value for each node from said input in accordance with said behavioral framework, infer from each of said behavioral parameter values one or more global parameter values for one or more global parameter nodes in said framework;

map said global parameter values in a forwards direction through each behavioral node of said framework, derive output from the inferred plurality of behavioral parameter values for behavioral output nodes of behavioral framework; and wherein the behavioral controller further comprises an animation subsystem arranged to generate equivalent behavior by the object using the derived output.

19. A behavioral controller as claimed in claim 18, wherein the animation subsystem is arranged to forward the output derived from the inferred behavioral parameter values to an animation system arranged to operate on the output to cause the appropriate behavior to be animated by the object.

20. A behavioral controller comprising a device arranged to have a suite of at least one computer program stored thereon, the suite of at least one computer program being executable on the device so as to cause the device to function as a behavioral controller as claimed in claim 19.

21. A behavioral controller as claimed in claim 18, wherein output from the behavioral controller is provided in a form suitable for being received as input by a behavioral controller of another object.

22. A behavioral controller as claimed in claim 18, wherein the behavioral controller generates body language behavior and further comprises a body language translation element for mapping received input derived from behavioral consistent with body language of a first culture to input consistent with body language of a second culture.

23. A behavioral controller as claimed in claim 18, wherein the object is a virtual object arranged to operate within a virtual environment.

24. A behavioral controller as claimed in claim 23, wherein the object is a virtual object arranged to operate within a virtual environment is taken from any one of the group of virtual environments consisting of:
a virtual computer game, a virtual on-line meeting, an on-line game, an on-line chat-room, an avatar hosted meeting; an avatar counseling meeting; an avatar based mediation environment; an avatar based sales environment; an on-line collaboration environment; and an on-line customer relationship management environment.

25. A behavioral controller as claimed in claim 18, wherein a software agent provides the input to an apparatus.

26. A behavioral controller as in claim 18, further comprising arranged to allow the assignment of a value to a behavioral parameter set, the parameter set comprising at least one parameter value associated with a behavioral characteristic of the object, wherein the value assigned using the interface is provided as input to the behavioral controller.

* * * * *